(12) United States Patent
Krasner

(10) Patent No.: US 8,576,895 B2
(45) Date of Patent: *Nov. 5, 2013

(54) RAPID ACQUISITION METHODS AND APPARATUS FOR GPS SIGNALS

(75) Inventor: Norman F. Krasner, Emerald Hills, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/353,099

(22) Filed: Jan. 18, 2012

(65) Prior Publication Data

US 2013/0022085 A1    Jan. 24, 2013

Related U.S. Application Data

(63) Continuation of application No. 12/763,026, filed on Apr. 19, 2010, now Pat. No. 8,111,736, which is a continuation of application No. 10/936,177, filed on Sep. 7, 2004, now Pat. No. 7,702,002.

(60) Provisional application No. 60/540,120, filed on Jan. 28, 2004.

(51) Int. Cl.
 *H04B 1/00* (2006.01)
(52) U.S. Cl.
 USPC .................................. 375/150; 701/469
(58) Field of Classification Search
 USPC ..................... 375/150, 346; 701/469
 See application file for complete search history.

(56) References Cited

U.S. PATENT DOCUMENTS

| 4,093,988 A | 6/1978 | Scott |
| 5,640,431 A | 6/1997 | Bruckert et al. |
| 5,781,152 A | 7/1998 | Renard et al. |

(Continued)

FOREIGN PATENT DOCUMENTS

| JP | 2000222389 | 8/2000 |
| JP | 2001237744 | 8/2001 |

(Continued)

OTHER PUBLICATIONS

International Preliminary Report on Patentability—PCT/US2005/003540, International Search Authority—IPEA/US—Alexandria, Virginia—Apr. 28, 2006.

(Continued)

*Primary Examiner* — Shuwang Liu
*Assistant Examiner* — David Huang
(74) *Attorney, Agent, or Firm* — Mary A. Fales

(57) ABSTRACT

A method and apparatus for receiving a signal from transmitters such as GPS satellites, for fixing the location of the receiver. Each of the transmitted signals includes a unique periodically-repeating sequence. A received signal is stored by the receiver for at least two repetitions of the periodically-repeating sequence. FFT operations are performed, and the resulting data frequency samples are pruned responsive to a hypothesized residual frequency, a procedure which significantly reduces the total number of subsequent calculations and therefore significantly reduces processing time. A correlation series is determined from the pruned samples and reference frequency samples corresponding to a hypothesized transmitter. If a match is found in the examination of this series, a code phase offset is determined; if not the process is repeated with another hypothesized residual frequency. Multiple correlation series similarly obtained may also be incoherently combined prior to this examination.

8 Claims, 9 Drawing Sheets

(56) References Cited

U.S. PATENT DOCUMENTS

| | | | |
|---|---|---|---|
| 5,852,630 | A | 12/1998 | Langberg et al. |
| 6,018,312 | A | 1/2000 | Haworth |
| 6,407,699 | B1 | 6/2002 | Yang |
| 6,496,533 | B2 | 12/2002 | Lennen |
| 6,735,243 | B1 | 5/2004 | Akopian |
| 6,757,610 | B1 | 6/2004 | Mann et al. |
| 7,092,433 | B2 | 8/2006 | Oesch et al. |
| 7,257,153 | B2 | 8/2007 | Kontola |
| 7,526,014 | B2 | 4/2009 | Hsu |
| 7,702,002 | B2 | 4/2010 | Krasner |
| 8,111,736 | B2 * | 2/2012 | Krasner ........................ 375/150 |
| 2005/0163201 | A1 | 7/2005 | Krasner |
| 2006/0023776 | A1 | 2/2006 | Hsu |

FOREIGN PATENT DOCUMENTS

| | | |
|---|---|---|
| RU | 2144210 | 1/2000 |
| WO | WO9966649 | 12/1999 |
| WO | WO0189105 | 11/2001 |
| WO | WO0213476 | 2/2002 |

OTHER PUBLICATIONS

International Search Report—PCT/US2005/003540, International Search Authority—ISA/US—Alexandria, Virginia—Apr. 15, 2005.
Supplementary European Search Report—EP05712838, Search Authority—Munich—Sep. 24, 2007.
Written Opinion—PCT/US2005/003540, International Search Authority—ISA/US—Alexandria, Virginia—Apr. 15, 2005.

* cited by examiner

COMB FREQUENCY NUMBER

|  |  | 0 | 1 | 2 | 3 | ... | MAX |
|---|---|---|---|---|---|---|---|
| 92a | 0: | $A_0$ | $A_K$ | $A_{2K}$ | $A_{3K}$ | ... | $A_{N-K}$ |
| 92b | 1: | $A_1$ | $A_{K+1}$ | $A_{2K+1}$ | $A_{3K+1}$ | ... | $A_{N-K+1}$ |
| 92c | 2: | $A_2$ | $A_{K+2}$ | $A_{2K+2}$ | $A_{3K+2}$ | ... | $A_{N-K+2}$ |
| 92d | 3: | $A_3$ | $A_{K+3}$ | $A_{2K+3}$ | $A_{3K+3}$ | ... | $A_{N-K+3}$ |

SUBSETS: HYPOTHESIZED FREQUENCY OFFSETS

TABLE SHOWING CIRCULAR ROTATION

RAPID ACQUISITION METHODS AND APPARATUS FOR GPS SIGNALS

RELATED APPLICATIONS

This application is a continuation of and claims priority to application Ser. No. 12/763,026, entitled "Rapid acquisition methods and apparatus for GPS signals", filed Apr. 19, 2010, which is a continuation of and claims priority to application Ser. No. 10/936,177, entitled "Rapid acquisition methods and apparatus for GPS signals", filed Sep. 7, 2004, which claims priority to Provisional U.S. Application Ser. No. 60/540,120, entitled "Rapid Acquisition Methods and Apparatus for GPS Signals", filed Jan. 28, 2004, all of which are assigned to the assignee hereof and hereby incorporated by reference.

FIELD

This application relates to apparatus and methods for computing the position of a mobile device by use of wireless signals, such as from GPS systems.

BACKGROUND

Position location devices are becoming increasingly popular, not only for ships at sea and adventurers in the wilderness, but also for the average person with a cell phone. The increasing popularity of personal position location devices has encouraged development of rapid, high sensitivity methods for acquiring the signals used to determine position.

Position location technologies typically utilize wireless signals concurrently transmitted from known locations to determine position. In GPS systems, these signals are concurrently transmitted from a multiplicity of satellites at a known time, and with a predefined frequency. On the ground, a GPS receiver acquires a signal from each satellite within its view of the sky. The times of arrival of the signals along with the exact location of the in-view satellites and the exact times the signals were transmitted from each satellite are used to locate the position of the GPS receiver via a trilateration calculation.

The acquisition of signals from the GPS satellites can be difficult due to a number of factors. For example, GPS signals are transmitted at a relatively low power, and from a great distance. By the time the GPS signals travel from earth orbit to a receiver, their initially low power has been greatly reduced, rendering the signal extremely weak at the receiver. The received signal levels may be further weakened by building blockage effects, such as may occur during indoor reception or reception in urban canyon environments.

There are two principal functions of GPS receiving systems:
(1) computation of the pseudoranges to the various GPS satellites; and (2) computation of the position of the receiving platform using these pseudoranges and satellite timing and ephemeris (position) data. The pseudoranges measure the time delays (or equivalently the ranges) between the satellites and the GPS receiver with a bias due to the local clock. In conventional autonomous GPS receivers, the satellite ephemeris and time of transmission data are extracted from the GPS signal once it is acquired and tracked. Collecting this information normally takes a relatively long time (30 seconds to several minutes) and must be accomplished with a good received signal level in order to achieve low error rates.

Virtually all known GPS receivers utilize correlation methods, or their mathematical equivalents, to compute pseudoranges. These correlation methods are performed in real time, often with hardware correlators. GPS signals contain high rate repetitive signals that are modulated in accordance with special sequences or "codes", called pseudorandom (PN) sequences. The codes available for civilian applications are called C/A codes, and are utilized to provide a binary phase-reversal rate, or "chipping" rate, of 1.023 MHz and a repetition period of 1023 chips for a code period of 1 millisecond (msec). The pseudorandom sequences in the GPS system belong to a family known as "Gold codes". Each GPS satellite broadcasts a signal with a unique Gold code.

For brevity, in the following discussion, we may use the terminology that a signal "contains a pseudorandom sequence" (or code), by which we mean it contains a waveform that is modulated in accordance with a pseudorandom sequence, or code The length of a frame of a pseudorandom sequence is the number of symbols of the sequence before it repeats. By the duration (in time) of a pseudorandom sequence we mean the duration of the waveform modulated in accordance with the pseudorandom sequence. Similarly, when we say frame rate of a pseudorandom sequence we mean the repetition rate of a waveform modulated in accordance with the pseudorandom sequence. It should be clear from the context whether the term pseudorandom sequence refers to a sequence of numbers or a waveform modulated according to such a sequence of numbers.

For a signal received from a given GPS satellite, following a down-conversion process to baseband, the signal is then correlated with a reference signal. For example, a simple correlation receiver multiplies the received signal by a locally generated reference signal containing a stored replica of the appropriate Gold code contained within its local memory, and then integrates, (e.g., low pass filters) the product in order to obtain an indication of the presence of the signal. This process is termed a coherent processing operation. Often the results of multiple successive coherent processing operations are detected (e.g., their magnitudes are determined) and combined in order to provide a final correlation output with higher fidelity. Hence, the initial correlation operations are coherent processing ones, and the latter combining step is called "noncoherent" or "incoherent" processing. In summary, correlation may include only coherent processing, or it may also include incoherent processing of the correlation output of two or more coherent processing steps. The final output of a succession of such correlation processing steps is termed a "final correlation output".

In this discussion a simple individual correlation process results in a single number (perhaps complex). However, in many cases of interest a multiplicity of such numbers are computed corresponding to different reference sequences (e.g., delayed versions), either serially or in parallel, by performing similar operations. We refer to such a set of numbers as a "correlation series". The final result of combining one or more successive correlation series is referred to as a "final correlation series."

By sequentially adjusting the relative timing of this stored replica relative to the received signal, and observing when high energy occurs in the resulting final correlation series, a simple receiver can determine the time delay between the received signal and a local clock. This time delay, modulo the one-millisecond code period, is termed the "code phase." The initial determination of the presence of such an output is termed "acquisition." Once acquisition occurs, the process enters the "tracking" phase in which the timing of the local reference is adjusted in small amounts in order to maintain a high correlation output. The correlation output during the tracking phase may be viewed as the GPS signal energy with the pseudorandom code removed, or, in common terminology, "despread." This signal is narrow band, with bandwidth commensurate with a 50 bit per second (bps) binary-phase-shift-keyed data signal that is superimposed on the GPS waveform.

Unfortunately, the correlation acquisition process is very time consuming, especially if received signals are weak. To improve acquisition time, most conventional GPS receivers utilize a multiplicity of correlators (up to 12 typically) which allows a parallel search for correlation peaks.

Some prior GPS receivers have used FFT techniques to determine the Doppler frequency of the received GPS signal. These receivers utilize conventional correlation operations to despread the GPS signal and provide a narrow band signal with bandwidth typically in the range of 10 kHz to 30 kHz. The resulting narrow band signal is then Fourier analyzed using FFT algorithms to determine the carrier frequency. The determination of such a carrier simultaneously provides an indication that the local PN reference is adjusted to the correct code phase of the received signal and provides an accurate measurement of carrier frequency. This frequency may then be utilized in the tracking operation of the receivers.

As mentioned above, the increasing popularity of personal position location devices has encouraged development of rapid, high sensitivity methods for acquiring the GPS signals used to determine position. One method, for example, uses an FFT algorithm to compute pseudoranges at a central processing location rather than at a mobile unit. According to that method, a snapshot of data is collected by a GPS receiver and then transmitted over a data link to a remote receiver where it undergoes FFT processing in order to compute the final correlation series. However, typically, only a single forward and inverse Fast Fourier Transform (corresponding to four PN periods) are computed to perform the set of correlations.

Another approach uses fast Fourier transform methods for acquiring GPS signals includes digitizing, storing, and processing a long block of raw data. For example, data corresponding to a one-second interval can be digitized and then processed locally using an FFT-based signal processing method to acquire the GPS signals present within this captured data block. In this method a multiplicity of FFT operations are performed, each producing a correlation series, and the results undergo both coherent and incoherent processing operations in order to produce the final correlation series.

Unfortunately, the GPS signal acquisition approach in such systems becomes less efficient when performing very long coherent integrations, such as those exceeding a period of one data bit (e.g., 20 GPS frames, which equals 20 msecs of time); the efficiency loss is especially great when the GPS carrier frequency uncertainty is large. Furthermore, it may be noted that in current GPS receiving systems coherent integration over periods exceeding one data bit requires that the GPS receiver have a priori knowledge of the bit sequence. Therefore, coherent integration over periods exceeding one data bit is normally done by transmitting such information from a server to a mobile station. This general approach has been standardized in several cellular communications standards, including IS-95, CDMA-2000, GSM, and UMTS standards. It should be noted that future GPS systems may have modes or signaling components that transmit PN signals containing no data. Hence in the future, there may be situations in which long coherent integration may be accomplished without the need for the receiver to have a priori knowledge of such a bit sequence.

Other prior approaches to coherent processing may be useful when (1) long coherent integration is required, (2) a search over a wide Doppler range is required, and (3) a code phase search must be performed over the full 1023 chips of each GPS signal to be processed. Such prior approaches, however, have a number of limitations and restrictions. For example, these algorithms may require processing data as a two-dimensional array and also limit the extent over which a Doppler search may be efficiently performed.

SUMMARY OF THE DISCLOSURE

A method and apparatus is described herein for receiving and processing one or more signals transmitted from a plurality of transmitters at predetermined frequencies. Each of the transmitted signals includes a waveform coded according to a periodically-repeating sequence that uniquely identifies the transmitter that sent each respective signal. The received signals are used in determining a location of the receiver. In one embodiment the transmitters comprise a plurality of GPS satellites that transmit GPS signals at a GPS frequency, each GPS satellite transmitting a waveform coded according to a unique periodically-repeating sequence. The signal's code phase offset at the receiver is found, and using this information from a number of transmitters, the receiver's position may be fixed using GPS algorithms.

As will be evident from the following description, higher sensitivity and higher processing speed can be achieved by performing FFT operations on the observed data; in conjunction with the FFTs, special pruning operations are used based upon a hypothesized residual frequency error to significantly reduce the total number of calculations and therefore significantly reduce processing time.

Particularly, at the receiver, the signal at the predetermined frequency is observed and digitized over a predefined period of time corresponding to at least two repetitions of the periodically-repeating sequences (two frames). One of the plurality of transmitters is hypothesized, and a set of reference frequency samples corresponding to the hypothesized transmitter is provided. A first subset of the digitized data is selected of duration at least equal to two frames, thus defining a block of data. A set of data frequency samples is then calculated from this block, such as by using Fourier transform techniques. A first residual frequency is hypothesized, and then the data frequency samples are pruned responsive to the hypothesized first residual frequency to provide a periodically-spaced first subset of the data frequency samples. The first subset of the data frequency samples and the reference frequency samples are further processed (typically with a multiplication and inverse FFT procedure) to provide a first correlation data series. This procedure may then be repeated upon additional data blocks (typically contiguous) and the multiple correlation series so found may be detected and added together to form a final correlation series. This latter series is then searched to identify a signal match, typically by looking for a strong peak in the final correlation series. If a matched signal is found, a code phase offset is determined from the final correlation data series; however if a matched signal is not found, then another residual frequency may be hypothesized, and the process repeated, typically using the same sets of data frequency samples and reference frequency samples, to search for a signal match. Similar processing proceeds until a signal match is found or until enough residual frequencies have been hypothesized without finding a match to assume that the signal from the hypothesized transmitter cannot be acquired.

Typically, there may be a number of transmitters that may be viewable by the receiver, and this process may be repeated for each of such transmitters in order to identify the signals and determine a code phase offset from each transmitter, if possible.

Many different embodiments can be implemented. In one embodiment, the pruning step further comprises selecting a subset of the data frequency samples, the subset including a plurality of samples having indices spaced relative to one another by an integer K, wherein K is the number of frames of the PN sequence in the data block.

In one embodiment, the method further comprises multiplying the subset of the data frequency samples with a set of reference frequency samples, to form a set of weighted frequency samples.

The reference frequency samples are obtained by any suitable method, for example the receiver may perform a discrete Fourier Transform (DFT) operation upon one or more periods of the periodically-repeated sequences to define the reference frequency samples, the reference frequency samples may be pre-calculated for each transmitter and stored in the receiver, or the reference frequency samples may be downloaded from a server, such as the PDE described herein.

The step of performing a correlation operation may include performing an inverse DFT upon the set of weighted frequency samples, in order to produce a correlation data series.

Each data block may have a size that corresponds to an integral number of repetitions of the periodically-repeating sequences two or greater, for example, five, ten, twenty or more. In some embodiments, the data block has a size within a range of about five to twenty repetitions of the periodically-repeating sequences. In other embodiments the data block has a size on the order of one hundred such repetitions.

The above method may be implemented in suitable hardware and/or software in the receiver, and/or on one or more servers in the wireless network. For example, some functions may be implemented in the receiver, and some functions may be implemented in a position determination entity (PDE).

The apparatus and method disclosed herein is particularly useful for assisted GPS ("A-GPS") systems in which the communication system, providing assistance information to the GPS receiver, is unsynchronized, as is the case for GSM and UMTS cellular standards. Although in synchronized communication systems such as CDMA-2000 standard, the requirements imposed upon the code phase search are greatly eased, there would still be benefits from using the improved algorithms discussed herein.

BRIEF DESCRIPTION OF THE DRAWINGS

Reference is now made to the accompanying drawings, wherein.

In the various figures of the drawing, like reference numerals denote like or similar parts.

DETAILED DESCRIPTION

Glossary of Terms and Acronyms

Figure 1:
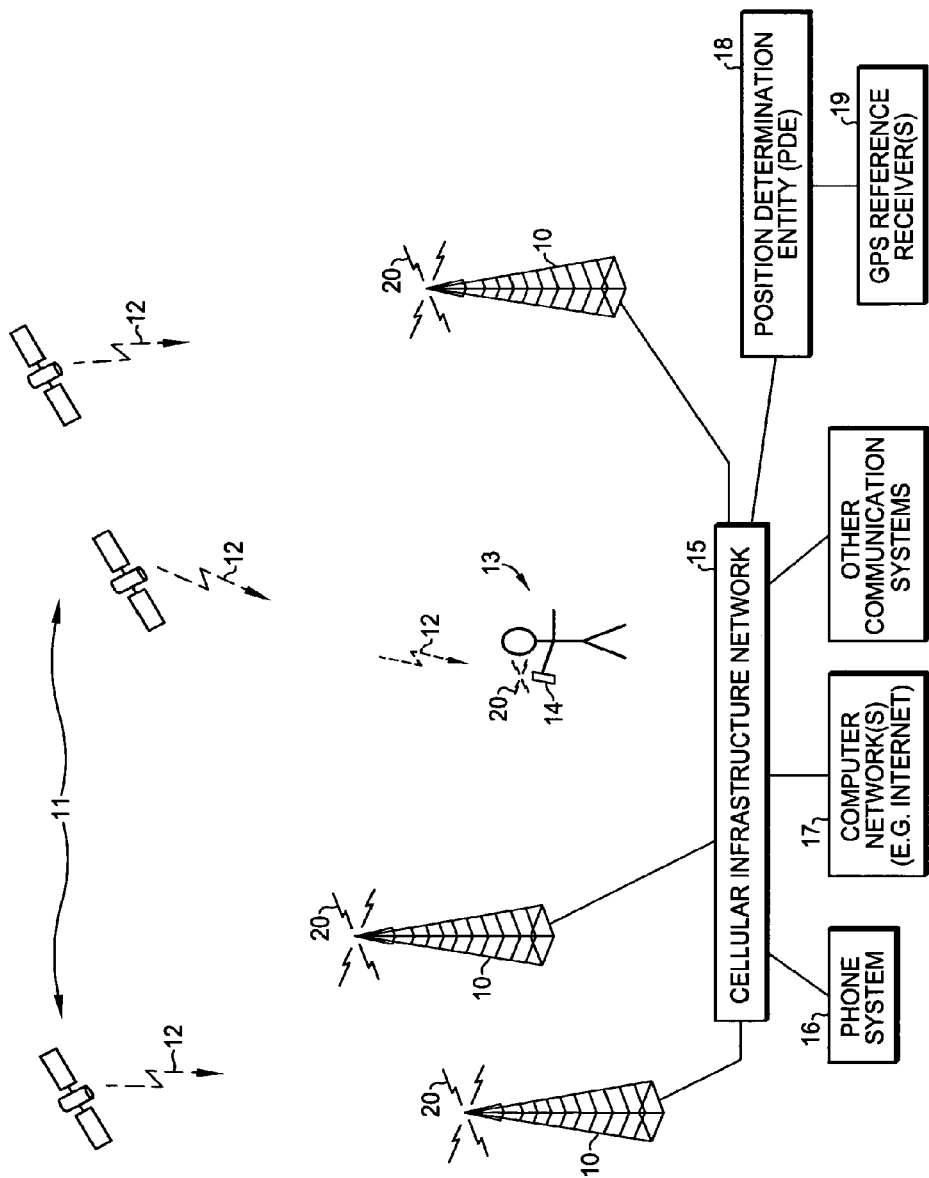
FIG. 1 is a perspective view of a communication and position location system that includes satellites emitting GPS signals, which are received by a GPS receiver in a mobile station, which is in communication with a plurality of base stations.

The following terms and acronyms are used throughout the detailed description:

A-GPS: Assisted GPS. A location technology in which special assistance to the GPS acquisition process is provided by a location server, which can reduce acquisition time and improve sensitivity.

Base Station or BTS: Base Transceiver Station. A fixed station used for communicating with mobile stations. Includes antennas for transmitting and receiving wireless communication signals.

CDMA: Code Division Multiple Access. A high-capacity digital wireless technology that was pioneered and commercially developed by QUALCOMM Incorporated.

Chip: A symbol, also the smallest part of a modulation (e.g., a phase reversal) of a pseudorandom (PN) sequence.

Chip rate: Symbol transmission rate.

Code phase: The relative timing between a frame boundary of a received signal modulated by a PN sequence contained within a received GPS signal and the frame boundary of a locally-generated signal modulated by PN reference sequence. For the U.S. GPS system, the code phase is normally a number that is between zero and the duration of one PN frame (i.e., 1 msec in the civilian GPS signal). Code phase may be considered the timing information extracted by the receiver that is used to determine position.

Coherent Processing (or Coherent Integration): The technique of processing a data block with linear processing, that is, without the use of nonlinear (e.g., detection) operations.

Correlation: The process of comparing a received signal and a reference signal. Correlation operations may include coherent integration and incoherent integration. In its simplest form a correlation operation results in a single number indicating the strength of the comparison. The output of a multiplicity of correlation operations as a function of different reference signals (e.g., delayed versions of one another) is termed a "correlation series". Multiple correlation series may be combined either coherently or incoherently (following nonlinear detection operations). The final result computed after completing all coherent and incoherent processing is called a "final correlation series."

Detection: The process of operating upon a set of samples by use of a nonlinear operation, typically a magnitude or a magnitude-squared operation, to determine the power in each data sample. For example, if each data sample is represented in an in-phase and quadrature (I-Q) component format, or in a "complex" format in which the in-phase component is associated with the real component of a data word and the quadrature component is associated with the imaginary component, then the detection process may calculate the magnitude or magnitude squared. In many cases, the magnitude operations are normal operations associated with complex numbers.

DFT: Discrete Fourier Transform.

FFT: Fast Fourier Transform. An efficient technique for calculating the DFT of finite-duration sequences. Note that the "frequency" data samples constructed from a DFT or an FFT algorithm are identical, and we may use the terminology "DFT data" and "FFT data" interchangeably. In most situations an FFT algorithm is used, however, to compute the DFT.

GPS: Global Positioning System. A technique utilizing distance measurements to GPS satellites to determine three-dimensional location (including altitude). Although the term GPS is often used to refer to the U.S. Global Positioning System, the meaning of this term includes other global positioning systems, such as the Russian GLONASS System and the planned European Galileo System. In some systems, the term Satellite Positioning System (SPS) is used in substitution for the GPS terminology. For illustrative purposes, the description herein is in terms of the current U.S. GPS System. It should be obvious, however, that the principles herein described may be applied to a variety of SPS systems that utilize similar signaling formats, as well as to future variations of the U.S. GPS System.

GPS SA message: The GPS Sensitivity Assistance message of the IS-801 protocol includes predicted bits of the currently visible SVs. The bits are predicted by the PDE and sent from the PDE to the MS in OTA ("over-the-air") format. These data bits are sometimes called (predicted) navigational message bits.

GPS fix: The end result of a process of measurements and subsequent computations by which the location of the GPS user is determined.

GSM: Global System for Mobile, another widely-used digital wireless technology.

Incoherent Processing: Combining several adjacent data sets, or series, by performing a nonlinear detection operation, followed by a summing operation, for reasons such as to improve the signal-to-noise ratio. For example, incoherent processing may include detecting and combining correlation outputs or series from multiple adjacent data blocks.

MS: Mobile Station, such as a cell phone that has a baseband modem for communicating with one or more base stations. MSs referenced in this disclosure include a GPS receiver to provide position determination capabilities.

PDE: Position Determination Entity. A system resource (e.g., a server) typically within the CDMA network, working in conjunction with one or more GPS reference receivers, which is capable of exchanging GPS-related information with an MS. In an MS-Assisted A-GPS session, the PDE can send GPS assistance data to the MS to enhance the signal acquisition process. The MS can return information such as pseudorange measurements back to the PDE, which is then capable of computing the position of the MS. In an MS-Based A-GPS session, the MS can send computed position results to the PDE.

Pseudorange measurement: A process employed by GPS receivers and based on signal processing techniques to determine the distance estimate between the receiver and a selected satellite. The distance is often measured in terms of signal transmission time from the SV to the receiver. The "pseudo" refers to the fact that the clock of the receiver is typically in error and therefore the measurement contains an uncompensated clock error term. In some cases the transmission time of the GPS signal is also unknown, or ambiguous, which provides a further timing error. In some cases pseudorange measurements are expressed in meters, by simply multiplying the transmission time by the speed of light. The units of measurement (e.g., meters of seconds) are usually clear by the context of the discussion.

SV: Satellite Vehicle. One major element of the Global Positioning System is the set of SVs orbiting the Earth and broadcasting uniquely identifiable signals.

UMTS: Universal Mobile Telephone Service: A third generation cellular standard utilizing a form of CDMA, designed to be the successor to GSM.

Table of Variables

| Variable | Description |
| --- | --- |
| a | scale shift or stretch factor for time parameter. |
| A | amplitude of a GPS signal. |
| d(t) | a data sequence; for GPS, the data sequence biphase modulates the carrier frequency $f_0$ at 50 baud. |
| $\epsilon$ | small frequency offset (e.g., $\epsilon$ = 50 Hz). |
| f | ideal carrier frequency transmitted from the SVs. |
| F(t) | waveforms corresponding to one frame of a carrier modulated by a PN sequence that is unique for each SV. F(t) is repeated once each "PN frame." F(t) is also referred to as one frame of a "PN sequence", although strictly speaking it is a waveform that is modulated according to a frame of a PN sequence. |
| f | received carrier frequency; the carrier frequency received by the MS is typically within a range of frequencies ($\Delta f$) about the ideal frequency $f_0$. |
| $f_e$ | residual carrier frequency: the remaining frequency after conversion of received carrier frequency to near baseband. |
| $f_r$ | frame rate of a waveform modulated according to a PN sequence (for C/A code of U.S. GPS signal, the frame rate is one kHz). |
| K | number of PN frame repetitions in a data block. |
| m | frequency index for a Discrete Fourier Transform (DFT) operation. |
| n | index to a sequence of integers, typically representing a time sample number. |
| N | number of discrete samples in an entire data block (N = KR). |
| P(t) | waveform of a repeating PN sequence (i.e., P(t) includes K periodic repetitions of F(t)). In one embodiment the transmission (e.g., chip) rate is 1.023 MHz, F(t) has a length of 1023 chips, and hence the PN frame rate would be 1 kHz, and P(t) has length K×1023 chips. In some cases P(t) is referred to as a repeating PN sequence, although strictly speaking it is a waveform modulated in accordance |

-continued

Table of Variables

| Variable | Description |
|---|---|
| | with a repeating PN sequence. |
| r | output time variable. |
| R | number of discrete samples in one PN frame period. |
| s(t) | a received GPS signal in absence of noise. |
| $s_b(t)$ | received GPS signal, frequency converted to near baseband. |
| S | sampling rate. |
| $T_c$ | time period over which a block of data is taken for coherent processing; also referred to as the "data block period", or the coherent integration (processing) time of a signal. |
| $T_s$ | sample time period, (i.e., $T_s = 1/S$). |
| $T_r$ | period of waveform modulated according to a PN sequence, (i.e., $T_r = 1/f_r$). |
| x(at) | time waveform received shifted by scale shift (or "stretch") factor a. |
| x(n) | a set of data samples for a data block: $x(0), x(T_s), x(2T_s), x(3T_s), \ldots, x(NT_s)$. |
| y(f/a) | the Fourier transform of x, shifted by scale shift (or "strech") a. |
| y(m) | the FFT (or DFT) of x(n) evaluated at frequency index m. |
| z(r) | matched filter output as a function of output time variable r. |
| θ | the phase of the carrier frequency waveform. |

The terms correlation, convolution and matched filtering may be utilized herein. The term "correlation" is used in its broadest sense to include any type of comparison, such as coherent integration with or without incoherent integration. For purpose of illustration herein, "coherent" correlation may be used to refer to correlation processes using only coherent integration For example, coherent correlation, as applied to two series of numbers, typically means the term by term multiplication of corresponding members of the two series followed by the integration, or summation, of the series. This is sometimes referred to as "serial correlation" and results in an output that is a single number. "Incoherent" correlation may be used to refer to processes that include incoherently (i.e., nonlinearly detecting and) adding the results of several adjacent coherent integration processes.

The term "convolution" as applied to two series of numbers is the same as that commonly used in the art and is equivalent to a filtering of the second series of length p with a filter, corresponding to the first series, having an impulse response of length q. The result is a third series of length p+q−1. The term "matched filtering" refers to a convolution, or filtering, operation in which the aforementioned filter has an impulse response that is the time-reversed complex conjugate of the first series. The term "fast convolution" is utilized to indicate a series of algorithms that computes the convolution operation in an efficient manner. Fast convolution algorithms often employ FIT algorithms, but are not required to do so.

GPS Environment

Figure 2:
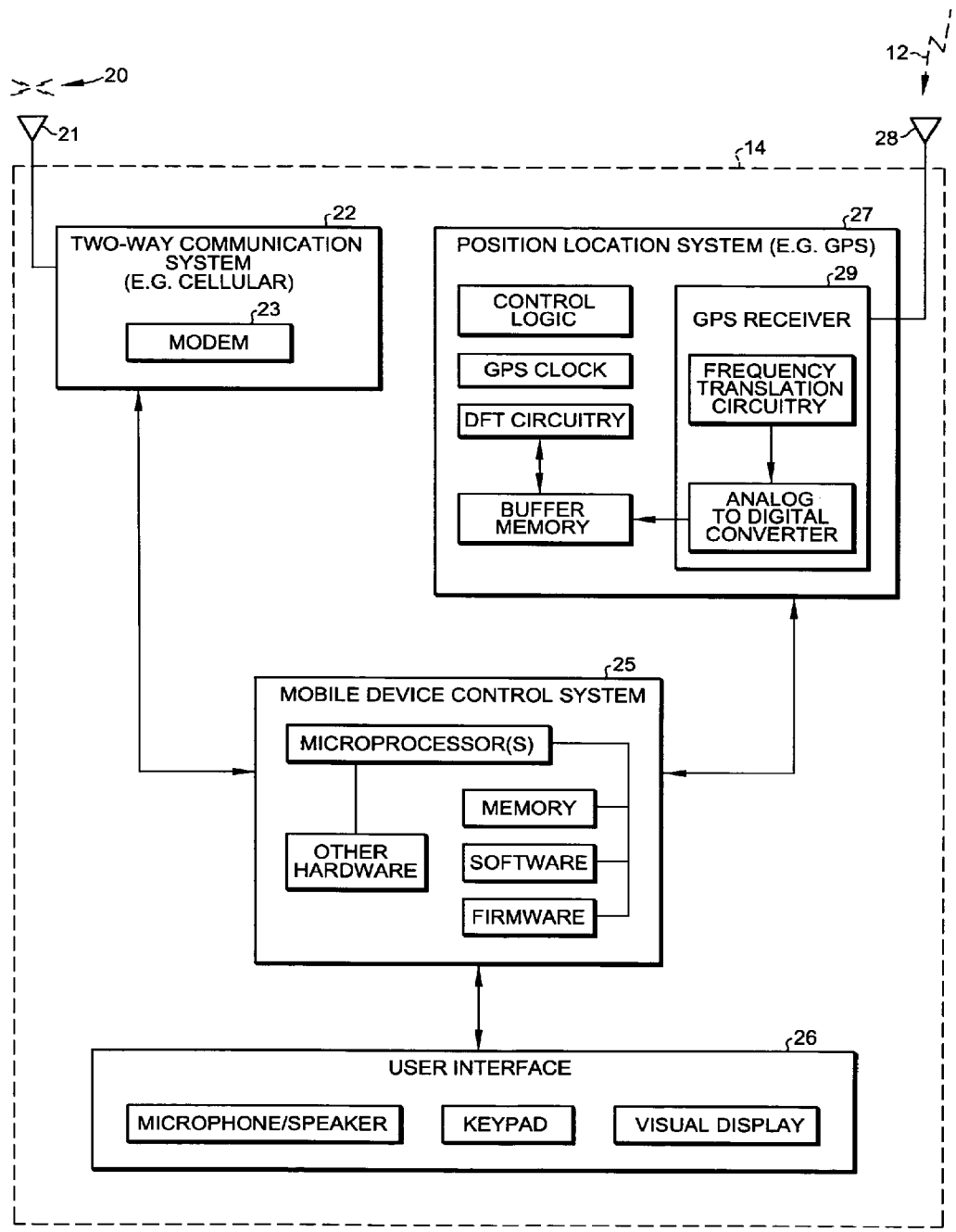
FIG. 2 is a block diagram of one embodiment of a mobile station, including a GPS receiver and a cellular communication system.

Reference is now made to FIGS. 1 and 2. FIG. 1 illustrates one GPS environment that includes a plurality of GPS satellites (SVs) 11 that emit GPS signals 12, a plurality of land-based base stations 10 that are part of a communication network, a mobile station (MS) 14 in communication with the base stations, and additional communication systems, also in communication with the base stations. The MS 14 is described elsewhere herein, for example with reference to FIG. 2, but generally includes a GPS receiver and a two-way communication system for communication with the base stations using two-way communication signals 20. It should be apparent that the GPS receiver could be implemented in a wide variety of mobile stations (other than cell phones) that communicate with one or more base stations. Furthermore, for ease of description herein, the position location system disclosed herein may be termed a "GPS" system; it should be recognized that the system described herein could be implemented in any satellite-based positioning systems.

A user 13, on foot, is illustrated grasping the MS 14; the user may be standing, walking, traveling in a car, or on public transportation, for example. It should be apparent that the mobile station may be positioned in wide variety of environments, and may be stationary or moving.

The GPS satellites (SVs) 11 comprise any group of satellites broadcasting signals that are utilized for positioning a GPS receiver. Particularly, the satellites are synchronized to send wireless signals 12 phased to GPS time. These signals are generated at a predetermined frequency, and in a predetermined format. In a current GPS implementation, each SV transmits a civilian type of GPS signal on the L1-frequency band (at 1575.42 MHz) in a format that is in accordance with GPS standards. As discussed in the background, when the GPS signals are detected by a conventional GPS receiver in the MS, the GPS system attempts to calculate the amount of time elapsed from transmission of the GPS signal until reception at the MS. In other words, the GPS system calculates the time required for each of the GPS signals to travel from their respective satellites to the GPS receiver. The pseudo range (in meters) is defined as: $c \cdot (T_{user} - T_{sv}) + c\, T_{bias}$, where c is the speed of light, $T_{user}$ is the GPS time when the signal from a given SV is received, $T_s$ is the GPS time when the satellite transmitted signal and $T_{bias}$ is an error in the local user's clock, normally present in the GPS receiver. Sometimes pseudorange is defined with the constant 'c' omitted. In the general case, the receiver needs to resolve four unknowns: X, Y, Z (the coordinates of the receiver antenna), and $T_{bias}$. For this general case, resolving the four unknowns usually requires measurements from four different SVs; however, under certain circumstances, this constraint can be relaxed. For example, if an accurate altitude estimate is available, then the number of SVs required can be reduced from four to three. In so-called assisted GPS operation, $T_{sv}$ is not necessarily available to the receiver and instead of processing true pseudoranges, the receiver relies primarily upon code phases. In a current GPS implementation, the code phases have one-millisecond time ambiguities, since the PN codes repeat every 1 msec. Sometimes the data bit boundaries may be ascertained, thus producing only 20-millisecond ambiguities.

The base stations 10 comprise any collection of base stations utilized as part of a communication network that communicates with the MS 14 using wireless signals 20. The base stations are connected to a cellular infrastructure network 15 that provides communication services with a plurality of other communication networks such as a public phone system 16, computer networks 17 such as the Internet, a position determination entity (PDE) 18 (defined above), and a variety of other communication systems shown collectively in block. A GPS reference receiver (or receivers) 19, which may be in or near the base stations 10, or in any other suitable location, communicates with the PDE 18 to provide useful information in determining position, such as SV position (ephemeris) information.

The ground-based cellular infrastructure network 15 typically provides communication services that allow the user of a cell phone to connect to another phone over the phone system 16; however the base stations could also be utilized to communicate with other devices and/or for other communication purposes, such as an internet connection with a handheld personal digital assistant (PDA). In one embodiment, the base stations 10 are part of a GSM communication network; however, in other embodiments other types of synchronous (e.g., CDMA2000) or asynchronous communication networks may be used.

FIG. 2 is a block diagram of one embodiment of the mobile device 14 incorporating communication and position location systems. A cellular communication system 22 is connected to an antenna 21 that communicates using the cellular signals 20. The cellular communication system 22 comprises suitable devices, such as a modem 23, hardware, and software for communicating with and/or detecting signals 20 from base stations, and processing transmitted or received information.

A GPS position location system 27 in the MS is connected to a GPS antenna 28 to receive GPS signals 12 that are transmitted at or near the ideal GPS frequency. The GPS system 27 comprises a GPS receiver 29 that includes frequency translation circuitry and an analog-to-digital converter, a GPS clock, control logic to control the desired functions of the GPS receiver, and any suitable hardware and software for receiving and processing GPS signals and for performing any calculations necessary to determine position using any suitable position location algorithm. In the illustrated embodiment, the analog to digital converter is connected to the buffer memory in the position location system, and a buffer memory is coupled to the DFT circuitry to provide and store the data during the DFT operation. In some assisted GPS implementations the final position location calculations (e.g., latitude and longitude) are performed at a remote server, based upon code phases and other information sent from the GPS receiver to the remote server. Some examples of GPS systems are disclosed in U.S. Pat. Nos. 5,841,396, 6,002,363, and 6,421,002, by Norman F. Krasner. The GPS clock is intended to maintain accurate GPS time; however, since most often accurate time is not available before a location fix, it is common practice to maintain time in the GPS clock software by its estimated value and an uncertainty associated with that value. It may be noted that after an accurate GPS location fix, the GPS time will often be very accurately known, (within a few tens of nanoseconds uncertainty in the current GPS implementations). However, when the final position location calculation is done at a remote server, this accurate time may only be available at the server.

A mobile device control system 25 is connected to both the two-way communication system 22 and the position location system 27. The mobile device control system 25 includes any appropriate structure, such as one or more microprocessors, memory, other hardware, firmware, and software to provide appropriate control functions for the systems to which it is connected. It should be apparent that the processing steps described herein are implemented in any suitable manner using one or more of hardware, software, and firmware, subject to control by the microprocessor.

The control system 25 is also connected to a user interface 26, which includes any suitable components to interface with the user, such as a keypad, a microphone/speaker for voice communication services, and a display such as a backlit LCD display. The mobile device control system 25 and user interface 26, connected to the position location system 27, provide suitable input-output functions for the GPS receiver and the two-way communication system, such as controlling user input and displaying results.

Coherent Processing

Figure 3:
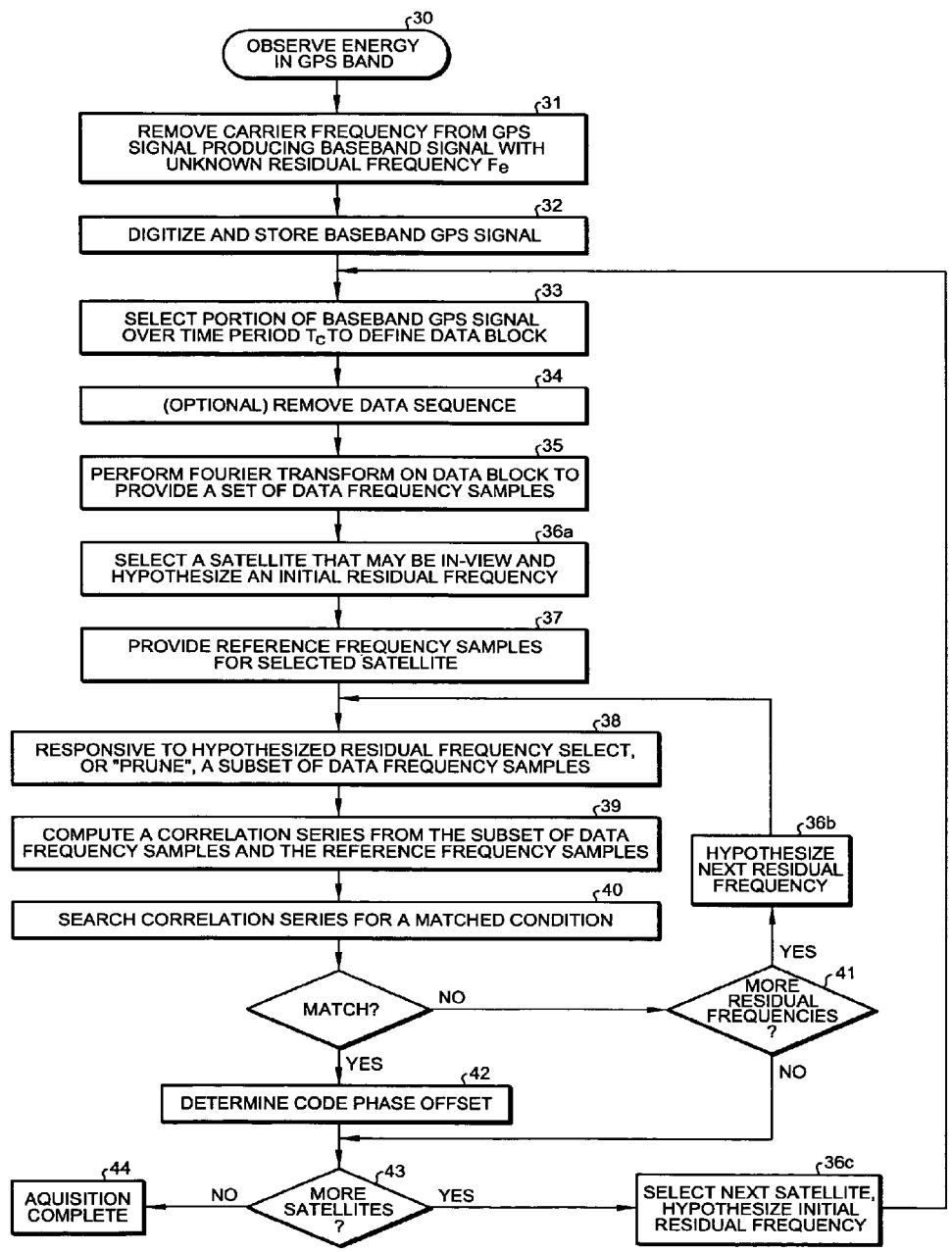
FIG. 3 is a flow chart that illustrates the coherent integration process described herein.

The coherent processing method is described with reference to FIG. 3 and other figures. FIG. 3 is a flow chart that shows a series of steps performed in a mobile station to process a received GPS signal to identify whether or not it matches a hypothesis that selects a GPS code and a carrier frequency offset. As will be described, the algorithm may examine all possible code phase offsets (e.g., 1023 offsets) to attempt to find a code phase offset match for a selected GPS code. The coherent processing algorithm then is repeated for each GPS code that may be viewable by the mobile station. Additional noncoherent processing may be added to the algorithm of FIG. 3 in order to further improve sensitivity. For simplicity of the current discussion, this added complexity is discussed later together with FIG. 11.

Observe GPS Signal (30)

In FIG. 3, at 30, the operation to observe the GPS signal is indicated. Essentially, the receiver receives electromagnetic energy with carrier frequency in the vicinity of the GPS carrier frequency with the expectation that GPS signals are present and detectable. The GPS signal (if present) is observed over a period of time at least as long as the period $T_c$. In the absence of noise, the functional form of a GPS signal can be represented theoretically at any time t as follows:

$$s(t)=Ad(t)P(t)\exp(j2\pi ft+\theta) \quad (A1)$$

where A is the signal amplitude, d(t) is a relatively low rate (e.g., 50 baud) data sequence that modulates the carrier (e.g., by bi-phase modulation), P(t) is the waveform consisting of a repeating set of frames of a PN sequence F(t), f is the carrier frequency (which is ideally equal to $f_0$), and $\theta$ is the carrier phase. It may be noted that equation (A1) is a complex representation of the carrier, which can be useful if quadrature sampling methods are utilized to process the signal; of course other representations may be used as appropriate. In real world situations it should be recognized that the various parameters are not completely stable, but for the explanatory purposes we assume that the signal amplitude and various modulation rates are approximately constant.

Figure 4:
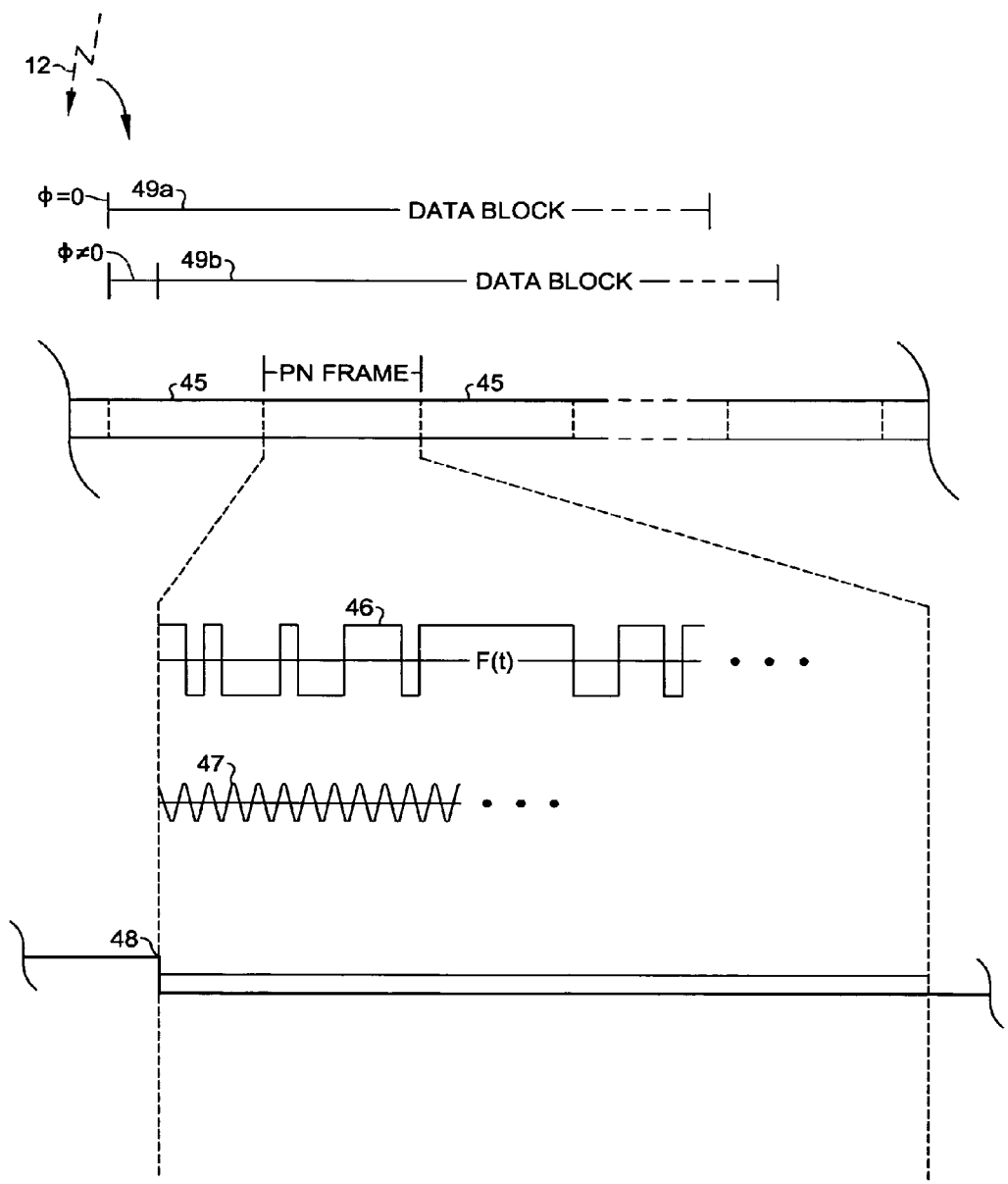
FIG. 4 is a block diagram that illustrates the structure and waveform components of a theoretical GPS signal.

FIG. 4 is a diagram that represents the structure of an ideal GPS signal described in equation (A1). The GPS signal is constructed of a series of PN frames shown at 45, each including a waveform F(t) 46 that is biphase modulated according to a particular pseudonoise (or "PN") sequence and a carrier frequency 47. An individual repetition of F(t) is termed a "PN frame". Each PN frame has a predetermined period $T_r$. At 48, a data transition of the data sequence d(t) is shown occurring at the start of one of the illustrated PN frames; however, because the data sequence d(t) is relatively low rate, the data transition 48 will happen only once per 20 PN frames (for the U.S. GPS C/A codes) and therefore the data transition may or may not occur at the start of an arbitrarily-chosen PN frame.

Each GPS satellite (SV) transmits a unique PN waveform F(t) shown at 46, which is a series of symbols (chips) transmitted at a predetermined rate. The PN waveforms are distinguished from one another by the particular PN sequence used to biphase modulate the carrier. For example, these sequences are chosen from a set of Gold codes, in C/A waveforms of the U.S. GPS system. Again, in the following we sometimes use the terminology "PN sequence" or "PN frame" for F(t), which is not strictly correct, since the PN sequence is actually the sequence of numbers that is used to construct the modulating signal of a carrier, thus producing the waveform F(t). However, it will be clear from the context that "PN sequence" used in this manner means a waveform modulated by the PN sequence.

In one example, the chip rate is 1.023 MHz and hence the PN frame rate would be about 1 kHz. This waveform F(t) is repeated continually; for example a first code from a first satellite $SV_1$ repeatedly transmits the unique sequence $F_1(t)$, $SV_2$ repeatedly transmits the unique PN sequence $F_2(t)$, and so forth. The GPS receiver is programmed with the unique PN sequences for all GPS satellites that may be in view. These PN sequences may be used in an algorithm to identify the particular satellite; particularly, when a satellite signal is received in a GPS receiver, the PN sequence is utilized to identify the satellite that transmitted the received signal. However, initially, the GPS receiver does not know the actual received code phase epoch, which, as described above, may range over a full PN frame (e.g., a period of 1 msec or 1023 chips). Furthermore, the receiver does not know if the GPS signal associated with a particular PN code is detectable, since it may be significantly attenuated by various obstructions and/or the particular SV may not be in view. Hence the receiver must search, either serially or in parallel, over the epoch uncertainty range in an attempt to detect the hypothesized signal and align the epoch of a received GPS frame with that of a locally-generated reference frame.

It should be noted that, in an actual GPS environment, the GPS receiver simultaneously receives a multiplicity of signals like the theoretical signal specified in equation (A1), each having a unique PN sequence F(t). For example, in a typical situation, the GPS receiver typically receives eight to twelve signals from a variety of in-view satellites at any time, and the various parameters differ from one another due to differing path lengths, directions of arrival, and Doppler frequency shifts, for example. For purposes of illustration, the following disclosure first discusses processing one of the signals of the theoretical form of equation (A1), and then later it is shown how the processing algorithms described herein may be advantageously used to process multiple signals, each having a theoretical form of equation (A1).

It may also be noted that, when the GPS signals reach the receiver, they are often heavily corrupted by additive noise, and perhaps also corrupted by other noise or interference. In addition, as previously mentioned, the carrier frequency and chip rate may appear to be shifted slightly from its original value, primarily by Doppler effects. In other words, the carrier frequency may shift slightly as observed by the receiver in the MS due to motion of the SV and that of the MS, and therefore when the receiver receives the signal, the actually-received carrier frequency may vary from its ideal predetermined carrier frequency $f_0$ by an amount called the "residual frequency". In addition, errors in the MS local oscillator also cause the carrier frequency to vary from its ideal frequency.

Remove Carrier Frequency from GPS Signal (31)

Referring again to FIG. 3, at 31, the carrier frequency is "removed" from the GPS signal by suitable frequency translation circuitry, leaving a residual frequency $f_e$. In order to remove the carrier frequency, the GPS signal is typically first converted to an intermediate frequency (IF) by a mixer. Then the converted GPS signal is processed to reduce the remaining IF component to approximately zero by any suitable analog or digital technique; for example, the IF frequency can be approximately removed by another mixer, or after converting the GPS to a digital signal in the analog-to-digital converter, digital processing mixing techniques may be used. In some implementations the frequency translation circuitry may provide a final frequency consisting of a small known frequency offset plus the aforementioned residual frequency. Since this small known frequency offset is a known constant, subsequent processing must only determine the residual frequency. For simplicity in the following discussion we assume that this small known offset is zero. However, it should be obvious to those skilled in the art, that the methods and apparatus discussed herein are equally applicable to the case in which such a known offset is nonzero.

Typically, the residual frequency arises primarily due to Doppler effects. In addition, the receiver itself may introduce a slight frequency shift during processing the signal. The sum of these two errors from the ideal carrier frequency may be represented by a certain maximum tolerance ($\Delta f$); therefore the actual received carrier frequency is typically within the range of $f_0 \pm \Delta f$. The residual frequency $f_e$, which is equal to the frequency remaining after the receiver has attempted to reduce the original carrier to zero, is typically in the range of several hundred hertz to several kHz, although the residual frequency may be more or less in any particular set of circumstances.

In assisted GPS systems, a predicted Doppler correction for all GPS signals is transmitted (in one form or another) from a PDE to the GPS receiver, and a list of the GPS satellites that may be in view is also sent to the receiver so that the GPS receiver can more efficiently search for satellite signals. A predicted data stream can also be provided by the PDE.

In its memory, the receiver has stored the PN codes (or a representation thereof, for example, the DFT of these codes) corresponding to all the GPS satellites that may be in its view.

Digitize and Store Processed GPS Signal (32)

At 32, the processed GPS signal is digitized (i.e., sampled) over a predetermined time period in the analog-to-digital converter (if it has not been previously converted), and then stored in the buffer memory in the GPS receiver. There is no theoretical restriction on the size of the data set, or the sample rate of the data, although it is sometimes beneficial that the sample rate be a multiple of 1.024 MHz and that the data set size be a multiple of 1024. Therefore the signal of equation (A2) is considered to be a sampled signal, where the sample rate may be advantageously set to a number that is 1.024 MHz or 2.048 MHz, so that 1024 or 2048 samples occur over the PN frame period of 1 msec. Note that due to Doppler-induced errors, this sample rate is not quite equal to the chip rate or twice the chip rate. One reason for choosing this sample rate is that if sampling is performed at 1024 or 2048 MHz, then the resulting number of samples, over a 1-msec frame period, is a power of two, which is convenient for efficient PIT processing. That is, one frame of data is a multiple of 1024 samples, a convenient size for efficient FFTs, and the total data set size (for coherent processing) is also a multiple of 1024, and preferably a power of two times this length. This restriction is not essential, however, since efficient algorithms still exist when the number of samples per frame is not a power of two.

Select Data Block (33)

At 33, a data block for coherent processing is defined by selecting a portion of the stored digital data over a predetermined coherent processing period $T_c$. The time period over which the data is combined for coherent processing is typically chosen to include a significant, integral number of PN frames (e.g., 20 PN frames); however, the coherent processing block should not be chosen to be too long; particularly, it may be disadvantageous to try to coherently process extremely large blocks (e.g., a one-second block) since the stability of the residual carrier frequency $f_e$ and other multipath effects (and possibly other factors) over that long time period may restrict or prevent any improvement in performance. As will be discussed, it is advantageous to choose $T_c$ to be an exact multiple of one PN frame period $T_r$.

Referring briefly to FIG. 4, the GPS signal is observed over a time $T_c$, which defines a data block such as a first data block 49a or a second data block 49b, and the time $T_c$ is chosen so that the data block has an integral number of PN frames 45. It may be noticed that, because the actual data block is received without prior knowledge of when the PN frame begins, the beginning and end of the data block can lie anywhere within a PN frame boundary; for example the data block may, by coincidence, extend from the beginning of a first PN frame to the end of a last PN frame as shown at 49a (code phase offset=0), but more likely the data block will extend arbitrarily from somewhere in the middle of a first PN frame to somewhere in the middle of a frame following the last full PN frame (as shown at 49b), so that the code phase offset is not equal to zero. As will be explained with reference to steps 39-42 for example, the code phase offset may be determined using a matched filter operation.

Removal of Data Sequence (34)

At 34, the data sequence is optionally removed. After the data sequence d(t) has been removed and the theoretical signal of equation (A1) has been converted to a frequency near baseband the remaining signal (ignoring noise and interference) has the form:

$$s_b(t) = AP(t)\exp(j2\pi f_e t + \theta) \quad (A2)$$

where $f_e$ is the residual frequency after conversion of the carrier frequency to near baseband.

Although optional, removal of the data sequences d(t) before processing can be very useful. To assist in data sequence removal, in some assisted GPS systems the predicted data sequences d(t) are sent (e.g., from a server) to the GPS receiver, together with some approximate times-of-arrivals of the GPS signals. In these cases, the GPS receiver can remove the data sequence d(t) and hence remove the pseudorandom polarity inversions that may occur every 20 msecs in the signal of equation (A1) due to the data sequence d(t). By removing the random polarity inversions (i.e., by removing d(t)), the coherent integration time can be increased to longer time intervals than one data bit period, for example greater than 100 msecs. Advantageously, increasing coherent integration time can improve the sensitivity of the GPS acquisition process. As indicated previously, some future modes of GPS may contain signaling components containing no data. In these situations the coherent integration period is not limited to a data bit period.

Perform Fourier Transform on Data Block (35)

Referring again to FIG. 3, it will be recalled that the carrier frequency was approximately removed to provide the signal $s_b(t)$ of equation (A2) with a residual frequency $f_e$, and the block period $T_c$ was chosen to be an exact multiple of the PN frame period $T_r$. In other words, $T_c = KT_r$, where K is number of frames in a block period. For example $T_c$ might equal 100 msecs if K=100 and $T_r$=1 msec.

At 35, the data block is coherently processed using a Fourier Transform process. This step may be called the "forward transform" process. For example, a Fast Fourier Transform (e.g., FFT or DFT) of the signal $s_b(t)$, sampled over the time period $T_c$, may be performed:

$$y(f) = \text{FFT}(s_b(t) \text{ from } t=0 \text{ to } t=T_c) \quad (A3)$$

The forward transform process can be performed in a variety of ways. One well-known approach is decimation in time; another approach is decimation in frequency. Other fast algorithms may be employed as appropriate or useful, such as chirp-z transforms or number theoretic transforms.

The FFT of an arbitrary signal (shown in FIG. 9 for example and discussed with reference thereto) includes a series of data frequency samples separated in frequency by the reciprocal of the duration of the data block being processed. For example, if the block duration ($T_c$) is 20 msecs, the frequency samples are spaced by 50 Hz. If the block duration is 80 msecs, the frequency samples are spaced by 12.5 Hz. Each data frequency sample may be identified by its frequency in Hz, or more conveniently, by its frequency index. Particularly each data frequency sample of a DFT can be designated with an integer (the frequency index), which may for example start at zero index for a zero frequency. For an N-point FFT, frequency index N/2 corresponds to a frequency in Hz of one-half the sample rate, (i.e., S/2). Frequency samples with index N/2+1, N/2+2, etc., corresponds to frequencies in Hz equal to $-S/2+1/T_c$, $-S/2+2/T_c$, etc.; that is they represent data corresponding to negative frequencies. If we re-order the data samples by selecting samples with indices N/2, N/2+1, N/2+2, ..., N−1, 0, 1, 2, ..., N/2−1, then the frequency data is assembled in an increasing order (in Hz) beginning with the most negative frequency and proceeding to the highest frequency. This re-ordering is used, for example, in FIGS. 5 and 6. In effect the frequency indices are considered circular, so that index m is equivalent to m+N and m−N. Hence index N/2+m is equivalent to index −N/2+m.

Figure 5:
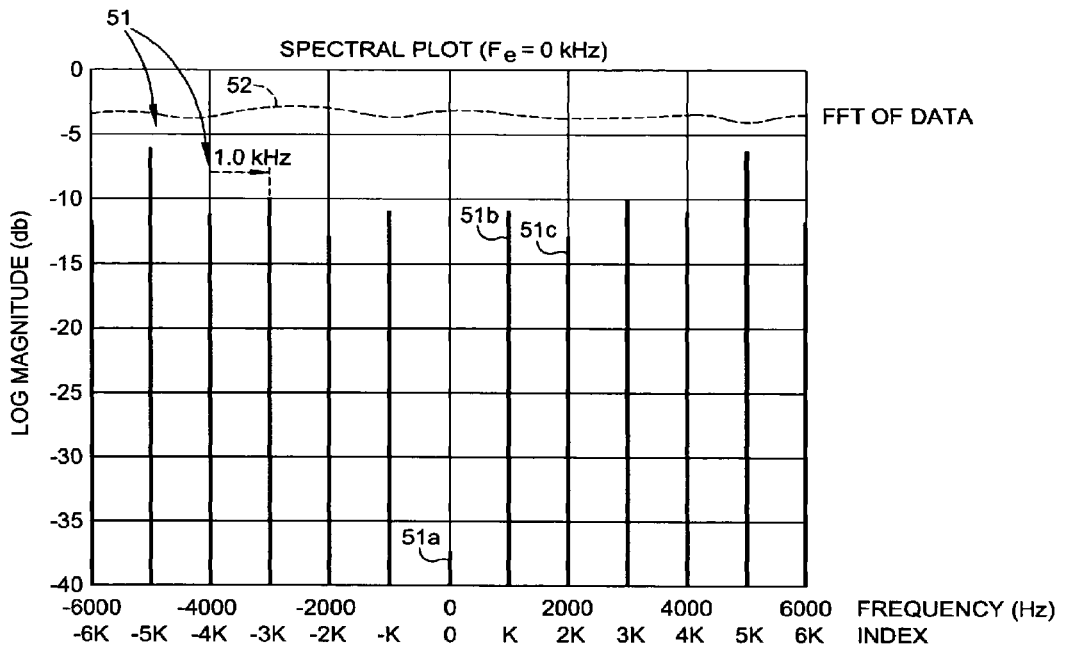
FIG. 5 is a graph that shows the power spectrum as a function of frequency of a GPS signal (Gold code #1 in this example) repeated 20 times, and with a residual carrier frequency $f_e = 0$.

FIG. 5 is a graph of the frequency spectrum of the noiseless (theoretical) GPS signal in the vicinity of zero (0) frequency (with the above reordering). FIG. 5 shows an FFT with a characteristic appearance due to the periodic repetition of the PN sequence, which is repeated every 1 msec for U.S. GPS C/A code. The noiseless FFT as illustrated includes a subset of data frequency samples (spectral lines) 51 with strong energy separated by a number of intermediate samples (not shown) with very low energy. Such a spectrum is sometimes called a "comb" spectrum, for obvious reasons, and the separation between consecutive strong samples is at frequency index multiples of K.

Particularly, the comb spectrum shown in FIG. 5 is a magnitude vs. frequency graph of the power spectrum corresponding to GPS Gold Code #1 repeated 20 times, sampled over a period of 20 msecs, and with residual carrier frequency $f_e$=0, normalized by the largest amplitude line (at 209 kHz, not shown on plot). In the example of FIG. 5 the series of spectral lines with strong energy are spaced apart by about 1000 Hz (1 kHz): a 0.0 Hz line 51a has an amplitude of about −38 dB, a 1.0 kHz line 51b has an amplitude of about −11 dB, a 2.0 kHz line 51c has an amplitude of about −13 dB. Between each pair of strong spectral lines are nineteen lines with low energy: these intermediate low energy lines are too low in amplitude to be represented in the logarithmic plot of FIG. 5. To be more explicit, at 51a one observes a spectral line at 0 Hz, and then the spectral lines at 50 Hz, 100 Hz, ..., through 950 Hz are very low in energy and are not displayed on the figure since they are too low in amplitude. Then, as seen in 51b, there is a strong line at 1000 Hz and then there are low energy lines are 1050 Hz, 1100 Hz, ..., and 1950 Hz. At 2000 Hz there is strong energy as indicated by 51c.

It may be noted that the separation of the strong spectral lines of the comb, measured in Hz, is equal to the frame rate $f_r$. Measured in frequency index difference, it is K indices, (i.e., the number of frames in the coherent data block).

Figures 9, 10:
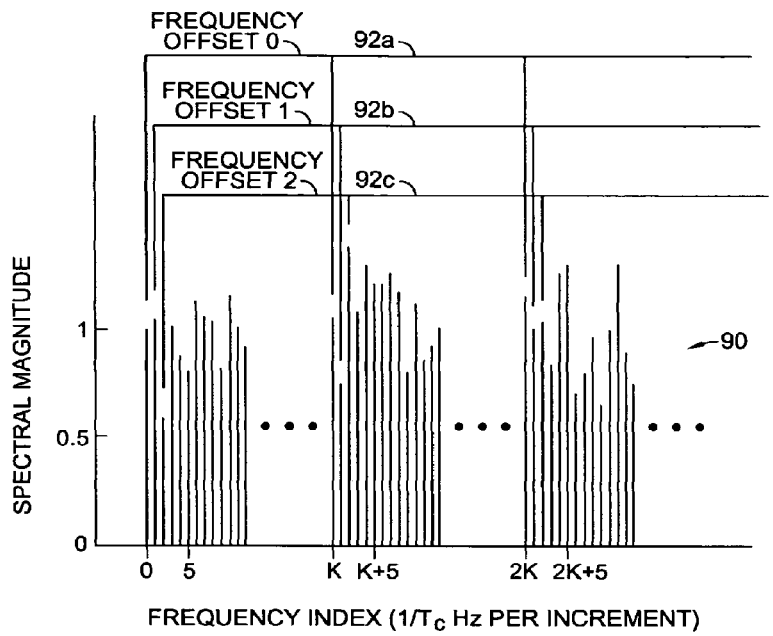
FIG. 9 is a graph that shows a data frequency set that represents the frequency content typical of actual data.
FIG. 10 is a table that shows subsets of data frequency samples corresponding to hypothesized frequency offsets, illustrating how subsets are defined for frequency selection of a hypothesized residual frequency.

While FIG. 5 shows a theoretical result with no noise present, it should be noted that the PIT of an actual received signal such as shown in FIG. 9 would exhibit such significant noise that the spectral lines would not be observable directly. In the example of FIG. 5, the average noise level of the FFT, shown at 52, typically exceeds the amplitude of even the strongest of the spectral lines.

Reference is now briefly made to FIG. 9, which is a graph that shows frequency content (the FFT) typical of actual data. The FFT of the actual data includes a number of data frequency samples shown generally at 90, which are collectively termed a "data frequency set," that extends to a highest frequency index (which corresponds to frequency in Hz of $S-1/T_c$). As shown in FIG. 9, the frequency separation between each of the data frequency samples is equal to the reciprocal of the block duration (i.e., the reciprocal of the time period of the sample $1/T_c$), therefore if the original FFT ordering is used, the largest frequency index is at $ST_c-1$.

Unlike FIG. 5, each of the data frequency samples 90 of FIG. 9 includes significant noise; therefore at each of the frequency indexes significant energy is found, unlike the theoretical GPS spectrum of FIG. 5 in which only periodic spectral lines (at frequency index K) have significant energy. In other words, due to noise, the amplitude of the spectral lines associated with the received GPS signal would be below the noise level, and therefore would not be directly observable. Stated another way, in an FFT of actual data the average noise energy level may be similar at all the frequency lines, and therefore the comb spectrum of FIG. 5 would not be observable and would remain unknown until subsequent processing.

Select Satellite that May be in View, Hypothesize Initial Frequency Offset (36)

Returning to FIG. 3, at 36a, initial assumptions are made in order to begin the algorithm. It should be noted that the GPS receiver simultaneously receives a multiplicity of signals like the theoretical signal specified in equation (A1), each having a unique PN sequence F(t) and therefore each providing a unique FFT of that PN sequence. For example, in a typical situation, the GPS receiver typically receives eight to twelve signals from a variety of in-view satellites at any time, but many of those signals may be too weak to detect. Therefore, there is uncertainty as to which satellites are providing a receivable signal, and additionally, even if detectable, the code phase offset of any receivable signal, which determines the time of arrival, is unknown a priori.

At 36a, a particular satellite that may be in view is selected or "guessed". The selection of any particular satellite may be random, or preferably may be based upon any suitable information, such as history or a list provided by the PDE. As will be discussed, the PN code for the selected satellite will be tested over all frequency hypotheses (in a range typically determined by the receiver), at least until a match is found or all hypotheses have been exhausted, and then at 36c, the next satellite will be selected and the corresponding PN code is tested over all frequency hypotheses, and so on until all candidate satellites have been selected, or until signals from a sufficient number of satellites have been found to complete a location fix.

Also at 36a, an initial hypothesis is made as to the residual frequency. If sufficient information is available to the GPS receiver, (e.g., a prior location fix has been made or estimated Doppler corrections are available), then this initial hypothesis and subsequent hypotheses may be made based upon this information. If no information is available, then a best guess may be made and searching would begin.

Provide FFT of GPS Code of Selected Satellite (37)

Returning again to FIG. 3, at 37, the Fourier transform of the GPS code corresponding to the hypothesized satellite is provided. This code, which may be locally generated or calculated in advance and stored, is sometimes called a "reference" code. These GPS codes are well known, and it is feasible to pre-compute and store the values for every GPS code in the GPS receiver. These GPS codes can then be Fourier transformed either before or after storage in the GPS receiver; for example a Fourier Transform (e.g., FFT or DFT) can be performed on a reference data set consisting of K repetitions of the PN sequence F(t), denoted P(t), as follows:

$$B(f)=\text{FFT}(P(t)) \text{ from } t=0 \text{ to } t=K_r=T_c) \quad (A4)$$

The result will be a comb spectrum including a series of evenly-spaced lines like the example shown in FIG. 5, which may be termed "reference frequency samples". Notice that only every $K^{th}$ frequency sample of B(f) is nonzero, a fact that reduces the required storage, since only nonzero values need be stored.

However, it is likely to be more efficient to pre-compute the Fourier transform of the repeated sequence, P(t) and then store only the nonzero Fourier-transformed values for each GPS code to allow quick use whenever required. It is easy to see that these nonzero values may be derived from the Fourier transform of F(t), rather than P(t), a fact that may reduce the computational burden. That is, it is normally sufficient to compute the FFT of only one repetition of F(t), rather than K repetitions, as was indicated in (A4), since the FFT of the repeated sequence may be derived from this shorter FFT. It should also be clear that the reference GPS code is normally assumed to have a code phase offset of zero and a carrier frequency offset of zero, and hence should be centered at 0.0 Hz and should look like the graphical depiction of FIG. 5 rather than FIG. 6.

A subtlety in the above computation concerns the fact that the U.S. GPS PN code is of length 1023 and a preferred FFT size is a power of two, typically either 1024 or 2048 in this discussion. If the FFT is pre-computed, then corresponding to a sample rate of 1.023 MHz, an appropriate procedure to create the FFT of appropriate size, would be to perform a 1023 point FFT of the reference and append an extra zero-valued sample between indices 512 and 513. Similarly, corresponding to a sample rate of 2.046 MHz, an appropriate procedure to create the FFT of appropriate size, would be to perform a 2046 point FFT of the reference PN (sampled at two samples per chip) and append two extra zero-valued samples between indices 1024 and 1025. These procedures are interpolation techniques performed in the frequency domain, and are more efficient in computation than performing an equivalent re-sampling approach in the time domain. In either case, the FFT of a repeated reference sequence can then be computed by simply inserting an appropriate number of zero-valued samples between each of the reference frequency samples corresponding to the FFT of one PN frame.

Select ("Prune") a Subset of the Data Frequency Samples (38)

When the data frequency samples were originally calculated in the FFT process at block 35, the residual frequency was unknown. In order to accurately and efficiently acquire a GPS signal, this unknown residual frequency must be found. In order to determine the residual frequency, a "trial and error" process may be utilized in which a series of residual frequencies are hypothesized, calculations are performed for each hypothesis, and the results are analyzed to search for a match. It should be recognized that the number of hypotheses may be large, and processing time increases with the number of hypotheses tested.

At 38, a subset of the data frequency samples is selected (i.e., "pruned"), responsive to a hypothesized residual frequency. As shown in FIG. 5 and discussed in connection therewith, the ideal GPS signal P(t) has a comb spectrum with periodic frequency spacing $f_r$, which is the FFT frequency spacing multiplied by the number of samples in the block (i.e., $(1/T_c) \times K = f_r$). Because this comb spectrum has nonzero samples that occupy only a fraction of the actual data frequency samples, significant reduction is possible in the complexity and time requirements of the frequency search. As previously noted the frequency spacing $f_r$ expressed in Hz is equal to the PN frame rate; expressed in indices it is equal to the number of repeated PN frames (K) in the data block.

For example, referring again to FIG. 9, if K=20, then the data frequency samples corresponding to the hypothesized residual frequency can be chosen by selecting a particular group of spectral lines such as 92a or 92b. Particularly, since P(t) has a comb spectrum, so does the baseband noiseless received signal $s_b(t)$ (see equation (A2)) since it contains a frequency-translated version of P(t). However, the actual comb lines of $s_b$ are not located at exact multiples of 1 kHz but are offset by the residual frequency (see FIG. 6), which must thus be determined.

If the sampling rate is 1.024 MHz, the block size is 20 msec, and there are 20 PN sequences in the block, then there are only 1024 lines of the DFT of P(t) with appreciable energy, since the spacing of the adjacent comb lines of the received signal is 1 kHz. This comb spacing limits the subset to only 1024 data frequency lines, and therefore a correspondingly reduced size inverse FFT can be utilized in subsequent processing.

As another example, if the sampling rate is 2.048 MHz, then there would be 2048 nonzero value comb lines, again with a 1.0 kHz comb frequency spacing, but now the energy extends over the larger 2.048 MHz passband. It may be noted that it is not necessary to sample at a rate that is a multiple of the frequency separation (e.g., 1.0 kHz), nor is it necessary that the sample rate be a power of two times 1.0 kHz; a comb spectrum for $s_b(t)$ would still remain. It is highly desirable, however, that the total sample period $T_c$ be a multiple of 1 msec in order to achieve true periodic convolution. Even this requirement can be dispensed with, as discussed later, likely at the cost of some performance or speed degradation.

Figure 6:
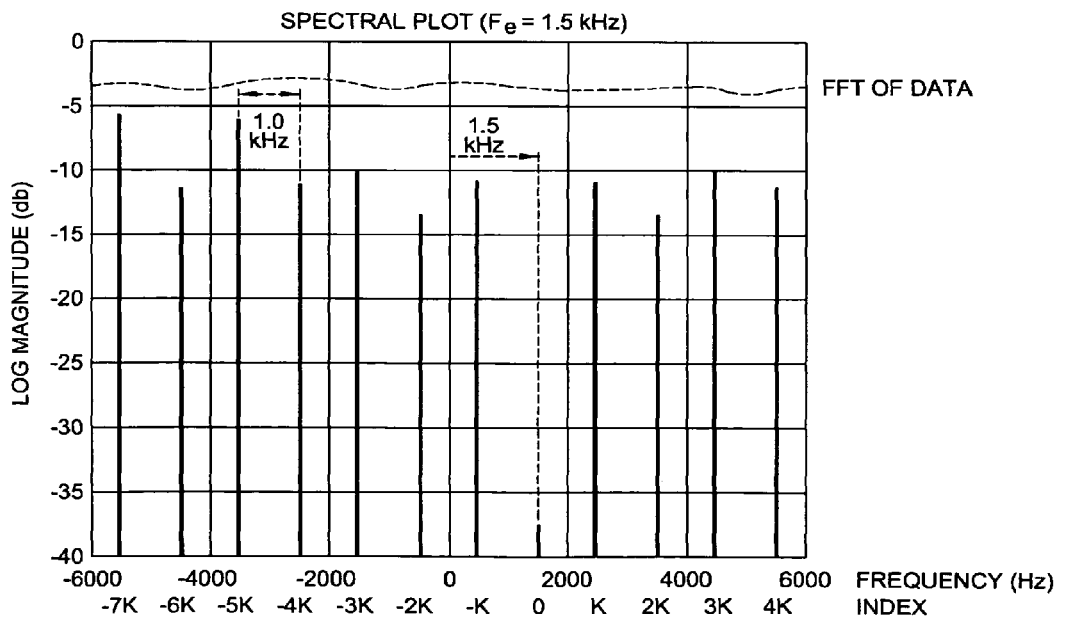
FIG. 6 is a graph that, like FIG. 5 shows the power spectrum as a function of frequency of a GPS signal (Gold code #1 in this example) repeated 20 times, but with the residual carrier frequency now about 4.5 kHz.

Reference is now made to FIG. 6, which like FIG. 5 is a graph of the power spectrum of an example GPS satellite (code #1) repeated 20 times, but with a residual carrier frequency of about 1.5 kHz (i.e., $f_e$=1.5 kHz), and with the spectrum normalized by the largest amplitude line (occurring at 209 kHz). A comparison of FIGS. 5 and 6 shows that there is a comb spectrum in both cases and also shows that the spectrum of FIG. 6 is simply offset relative to that of FIG. 5 by the residual frequency $f_e$, which in this example is about 1500 Hz. Hence a hypothesis of 1500 Hz (in this example the true carrier frequency offset) will result in a proper selection of the set of frequency lines containing signal energy. Again, it is emphasized that even if the GPS signal spectrum appears like FIG. 6, it is actually obscured by noise such as shown in FIG. 9 that appears in each of the frequency samples (not just the comb samples). But the noise that occurs between the frequency samples of the GPS signal comb are irrelevant for detecting the GPS signal since they contain little GPS signal energy. Accordingly we need only use the frequency information at the comb line locations for the purposes of detecting the GPS signal. As will be discussed in detail, each frequency hypothesis will dictate that a different set of possible comb frequencies be processed; in effect these different sets of possible comb frequencies are merely circularly shifted versions of one another.

The terminology "pruning" refers to the fact that we are selecting only every $K^{th}$ sample from the frequency data. In the prior example where $T_c$ equaled 20 PN frames, K equaled 20, (i.e., we need only select every $20^{th}$ sample of the FFT data for use in subsequent processing). More generally, K is the number of repetitions of the PN code in the coherent data block being processed. Such pruning leads to dramatic reduction in the amount of subsequent processing.

Reference is now made to FIGS. 9 and 10. FIG. 9 is an example of typical data frequency samples including noise that obscures a GPS signal; FIG. 10 is a table that shows subsets of data frequency samples corresponding to hypothesized positive frequency offsets (for simplicity of explanation), illustrating how every $K^{th}$ sample is chosen to define the subsets for frequency selection of a hypothesized residual frequency. To hypothesize a zero frequency offset, we translate the selection to a first subset 92a that includes every $K^{th}$ sample beginning at frequency index zero ($A_0, A_K, \ldots$), which is shown at 92a in FIGS. 9 and 10, and corresponds to row 0 in FIG. 10. To hypothesize a one index frequency offset, a second subset 92b is chosen that includes every $K^{th}$ sample but offset by frequency index one ($A_1, A_{K+1}, \ldots$), which corresponds to row 1 in FIG. 10. To hypothesize a two index frequency offset, a third subset 92c is chosen that includes every $K^{th}$ sample offset at frequency index two ($A_2, A_{K+2}, \ldots$). To hypothesize each subsequent frequency offset, this process, sometimes called circular rotation, continues by translating the chosen data frequency samples by an integral number. The number of frequency offsets may well exceed K (corresponding to more than the frame rate). The frequency data set is considered circular, that is, frequency K is the same as K−N and K+N, for example. Thus, one sees that the last several data samples of a given row, may actually correspond to the first data samples of the first row. For example in 92c, if K were equal to 2, the last index of 92c would be N−K+2−N=−K+2=0 and the last index of 92d would be N−K+3−N=−K+3=1. In this example the last element of 92c and 92d would thus be $A_0$ and $A_1$, respectively. Similarly, a negative frequency offset (not shown in the table) is hypothesized by selecting "negative frequencies" first. As an example the smallest negative frequency hypothesis would correspond to selecting data $A_{-1}, A_{K-1}, A_{2K-1}, A_{3K-1}, \ldots, A_{N-K-1}$, which is identical to $A_{N-1}, A_{K-1}, A_{2K-1}, A_{3K-1}, \ldots, A_{N-K-1}$. Notice that the first sample of this array is actually the last of the FFT frequency samples. As noted earlier, it may be convenient to reorder the array beginning with $A_{N/2}$, so that the majority of the frequency data is increasing in frequency, expressed in Hz.

In FIG. 10, the columns designate the "comb" frequency index, that is the index of the pruned arrays having only N/K elements; each row designates the values at the hypothesized comb frequency indices. Of course, combs beginning with negative frequency offsets are allowable and have rows constructed as indicated in the prior paragraph.

In summary, the information useful for identifying a GPS signal's presence is contained substantially only within spectral lines that are displaced from one another by a constant amount (1 kHz in this example) and offset by the residual frequency; therefore following a hypothesis of a residual frequency, the set of spectral lines (the comb) corresponding to that frequency offset can be selected from the FFT and the rest ignored for subsequent matched filter calculation purposes corresponding to the hypothesized residual frequency. Advantageously, this reduced number of spectral lines can significantly reduce the number of subsequent calculations required and thus reduce processing time for each hypothesized residual frequency; particularly, if we are utilizing a sample rate of S, instead of having to perform an inverse FFT of size $ST_c$, as would be otherwise necessary in the matched filter operation of step 39, we need only perform an inverse FFT of size S/1 kHz. As an example if we assume that $T_c$=128 msecs, we might normally have to perform an inverse FFT of size 128×1024, if the sample rate were 1.024 MHz. Taking advantage of the sparseness of the spectrum (i.e., the fact that the GPS signal has a comb spectrum) we need now only compute an inverse FFT of size 1.024 MHz/1 kHz (i.e., 1024), a processing savings well exceeding a factor of 128 (more precisely: 1.7×128). Furthermore, the processing savings advantage improves as the total coherent processing time $T_c$ increases; particularly it can be seen that the FFT size reduction is related to the number of repetitions of the PN sequence F(t) (i.e., the FFT size reduction factor is improved with a greater number of PN frames coherently integrated).

Compute a Correlation Series (39)

At 39, an operation is performed to form a correlation series from the subset of data frequency samples and the reference frequency samples (e.g., GPS code). To accomplish this an FFT based matched filter operation may be performed as follows:

Multiply the selected subset of data frequencies by the complex conjugate of the FFT of the GPS code; and (A5)

Perform an inverse FFT of the result of equation (A5) and perform a detection operation upon this resulting data set. (A6)

The result will be a circular convolution of $s_b(t)$ and P(t), which will provide the proper correlation information, assuming that the duration of $s_b(t)$ is an integral number of PN frames. Note that this basic procedure required processing long data sets of duration $T_c$ (i.e., this procedure required performing large size forward FFTs). However, there are efficient ways of performing such large FFTs, as are well known. The computational benefits accrue from having to perform only very small size inverse FFTs, due to the pruning procedure. Since many inverse FFTs may need to be performed corresponding to many frequency hypotheses, the resulting computational savings may be dramatic. This will be further justified mathematically in a later discussion.

For purposes of explanation, the method of steps 33-39 disclosed above corresponds to processing one block of data in a coherent manner, which is a type of correlation termed herein "coherent correlation" or "coherent processing." In order to improve sensitivity, the correlation outputs from a number of coherent correlation processes may be detected and combined over a number (e.g., 2 to 2000 blocks, typically 5 to 200 blocks) of adjacent time intervals to provide the correlation results. This process is termed "incoherent correlation", and is later discussed in more detail together with FIG. 11.

Search Correlation Results for Match (40)

At 40 in FIG. 3, the correlation results (series) are analyzed to determine if a match has been found. This operation can be performed in any of a number of suitable algorithms, such as described below.

Figure 7:
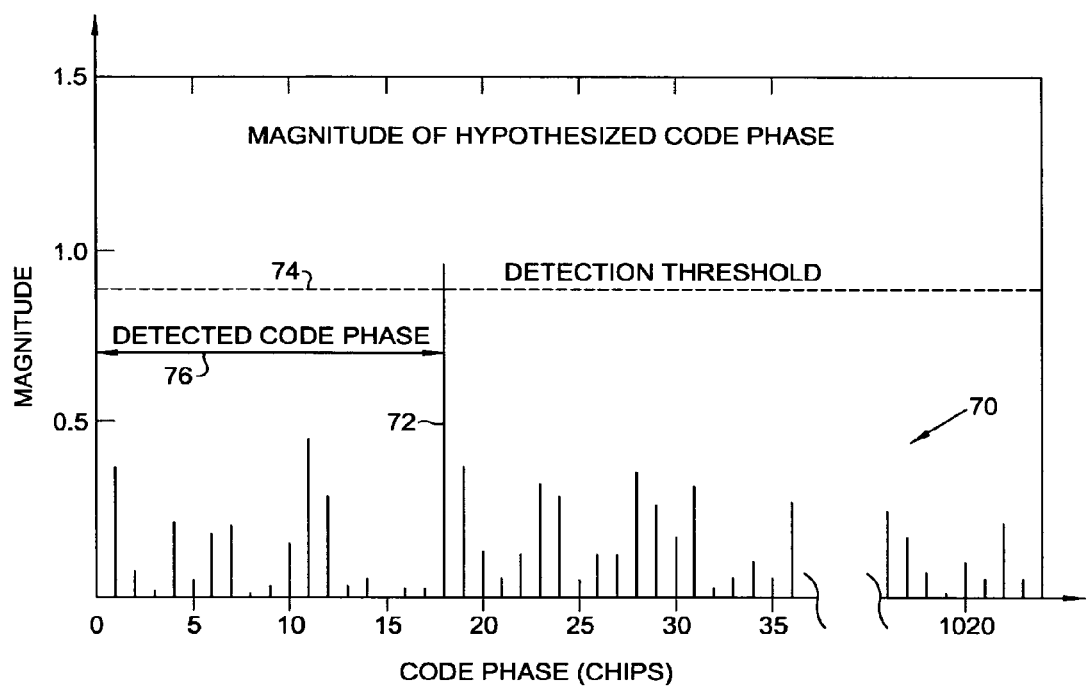
FIG. 7 is a graph of one example of the results of a matched filter operation, showing amplitude as a function of frequency.

FIG. 7 is a graphical example of the results of the correlation operation of step 39, showing amplitude as a function of hypothesized code phase. The results of the matched filter operation, or correlation operations, of step 39 are termed a "correlation series". As discussed below, multiple correlation series may be combined (coherently and/or incoherently) in order to provide improved performance. This combined series is termed a "final correlation series" since this series of number may be advantageously examined in order to determine a matched condition. Returning to FIG. 7, one sees that the graphed result is a series of lines 70 at distinct code phases, spaced apart equally, typically in increments of one chip or one-half chip increments. In order to determine whether or not a match has been found, any suitable peak finding type search algorithm may be employed. For example, the magnitude of each line may be considered. For example, if the magnitude of the line for a particular hypothesized code phase is the largest of all the lines, and its amplitude meets or exceeds a predetermined threshold, then it may be assumed that a match has been found. In FIG. 7, a line 72 appears to be the largest; therefore, if the detection threshold (shown for example at 74) is the predetermined threshold, then the code phase of line 72 (i.e., code phase position 18) will be assumed to indicate a match. Other algorithms may be used, such as those which determine all peaks above a given threshold and then retain all such peaks as potential matches.

Referring again to FIG. 3, after step 40, if a match has not been identified, then operation moves to a decision 41. At 41, if there are more residual frequencies to be searched, then another frequency hypothesis is made at step 36b, and steps 37-40 are repeated. However, if there are no more residual frequencies to be searched, then operation moves from 41 to decision 43, discussed below, which determines if there are more satellites to search. Returning to the decision at step 40, if a match has been found, then operation moves to step 42 where the code phase offset is determined.

Determining Code Phase Offset (42)

As discussed above for example with reference to FIG. 4, when the data block was sampled, the code phase was not known; that is, the beginning and end of a PN frame period have not yet been ascertained. Particularly, although the data block has an integral number of PN frames 45, the starting position of the data block is unknown, and therefore the beginning and end of the data block can lie anywhere within the PN frame. For example the data block may, by coincidence, extend from the beginning of the first PN frame to the end of the last PN frame as shown at 49a (code phase offset=0), but more likely the data block will extend from an arbitrarily point within the first PN frame as shown at 49b, to the same point within the frame following the last full PN frame (code phase offset≠0).

At 42, following a positive search result (i.e., after a match has been found in step 40), the code phase offset is determined from the results of the matched filter operation of step 39 Particularly, before the matched filter operation, the number of possible code offsets is known; in an example disclosed herein in FIG. 7, the number of possible code offsets range from zero to 1023 (a total of 1024 possible code phases if a 1024-point FFT is used), which is the number of code phase offset steps over a one-millisecond interval. After the matched filter operation, line 72 (which identified the existence of a match) also indicates the code phase offset as the number of steps from zero. In the example of FIG. 7, the code phase offset is at code phase position 18, which translates to about 18/1024 msecs in this example. Note that this phase offset is relative to the phase of a locally generated clock within the GPS receiver. In many cases this phase offset precision is improved through an interpolation procedure that combines the level at a specified code phase with those in its neighborhood.

At 43, a decision is made as to whether or not signals from additional satellites are to be searched. This decision is made in accordance with any suitable criteria; for example, if signals from sufficient satellites have already been found to make a location fix, or if the list of possible in-view satellites has been exhausted, then a decision may be made to stop searching and therefore, as indicated at 44, the acquisition operation is complete. However, if signals from more satellites are to be searched, then at 36c, the next satellite is selected, an initial residual frequency is hypothesized, and steps 37-42 are performed with the new assumptions.

Summary and Additional Discussion

Utilizing the knowledge that the PN sequence F(t) repeats a number of times in a coherent processing data block, as discussed herein it has been recognized that a simpler inverse FFT procedure is possible as part of the overall matched filter procedure, which advantageously reduces computation time. It may be noticed that if only one Doppler hypothesis were to be searched, the improvement in processing time would not be particularly significant. However, because searches must usually be performed over a large number of Doppler hypotheses (e.g., a search over ±500 Hz would not be unusual) then this processing savings advantage as described herein quickly becomes very substantial. One reason for the processing savings is that each Doppler hypothesis requires a separate inverse FFT to be performed; however, in the approach discussed herein, the inverse FFT size is independent of the size of the coherent frequency block due to the fact that one need only process frequency samples at the hypothesized comb frequency locations. The number of such frequency samples is easily seen to equal the number of data frequency samples over one PN frame. In the above example, with a 128-millisecond processing block size, the inverse FFT sizes required are reduced by a factor of 128, resulting in improved processing speed by a factor of more than 128. Although a large forward FFT must be performed as in Step 35, this large operation need only be done once per GPS code searched, and in some cases one forward FFT may be shared for multiple hypothesized GPS codes.

Typically, to search over a large Doppler range, a correspondingly large number of Doppler hypotheses are sequentially made and performed one after the other, which thus would require performance of a large number of inverse FFTs. For example, to search over a range of residual carrier frequencies $f_e=\pm 2$ kHz, with a 128-millisecond coherent integration time, a number of Doppler hypotheses would be required, (i.e., a number of inverse FFTs would be performed equal to at least 512=4000 kHz×128 msec). In the prior example the inverse FFT sizes need only be 1024 points rather than 131072, which would result in a savings of computation time by a factor of about 218 (noting that FFT processing time is proportional to $N \log(N)$, where N is the transform size). For example, using currently available technology, a 1024-point FFT can be performed in under 0.5 msecs using low cost DSP integrated circuits, thus resulting in overall processing time for the entire set of inverse FFTs of less than 0.26 seconds, whereas without taking advantage of the sparseness of the data, the processing time would be about 1 minute. Furthermore, since one must search over a multiplicity of hypothesized GPS PN codes, the processing time required with conventional FFT processing may become impractical, whereas with the disclosed approach it is easily practical.

The searching over various Doppler hypotheses is simplified by recognizing that the adjacent spectral lines of the FFT are separated from one another by a predetermined number, which in this example is $1/T_c$ Hz (e.g., if $T_c=128$ msec, then $1/T_c=1/128$ msec=7.813 Hz). Therefore, for a given PN code, it is not necessary to again perform the forward FFT for each frequency: to alter a frequency hypothesis, we need only shift the FFT of $s_b$ by one index position (the index value is determined as appropriate to make signal acquisition likely without unnecessary effort). Let y equal the FFT of $s_b$. In the example where the sample rate is 1.024 MHz, and T=128 msec, if the frequency hypothesis were zero, we would then process samples of y numbered 0, 128, 256, . . . , etc. If the residual frequency hypothesis is 7.813 Hz, then we would process samples numbered 1, 129, 257, etc. If the residual frequency hypothesis is −7.813 Hz we would process samples 131071, 127, 255, and so forth. (Note that index 131071 is equivalent to −1, since the spectrum is periodic with period 131071). The pruned processed block for each case is multiplied by the complex conjugate of the nonzero FFT samples of the reference GPS waveform. The result is inverse-transformed to provide a matched filter output representative of one PN frame. A peak magnitude (or magnitude-squared) found above a threshold in this output is representative of the presence and time of arrival of a received GPS signal having the GPS signal number and the Doppler frequency corresponding to that used in the processing sequence. As will be discussed below, in some case we might desire to shift the FFT by a fraction of an index number. This may be done using frequency interpolation methods, as discussed below, rather than by simply rotating or shifting the frequency set.

Figure 8A:
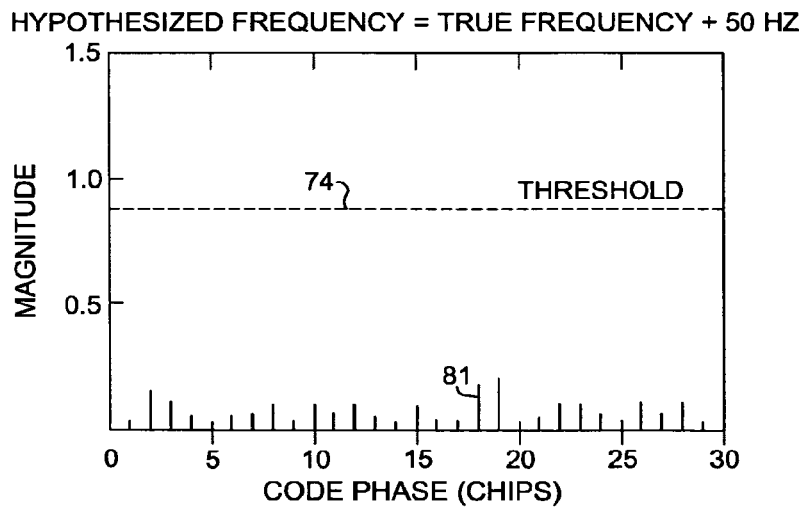
FIGS. 8A, 8B and 8C are a set of graphs comparing the results of matched filter operations for differing Doppler frequency hypotheses.
Figure 8B:
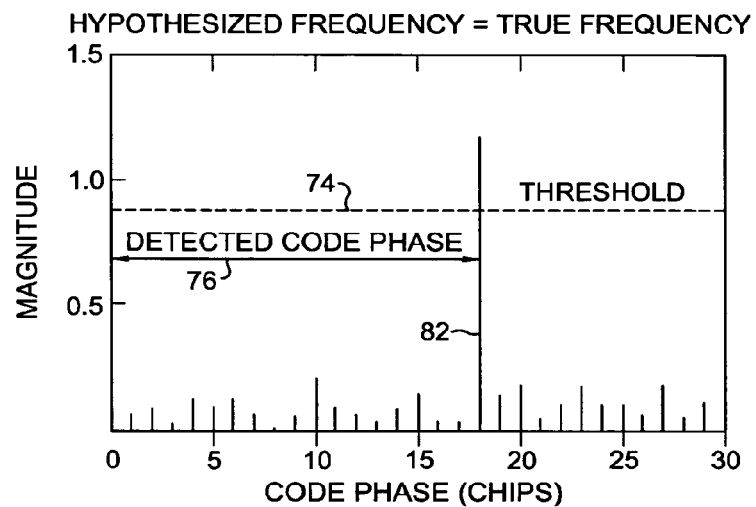
Figure 8C:
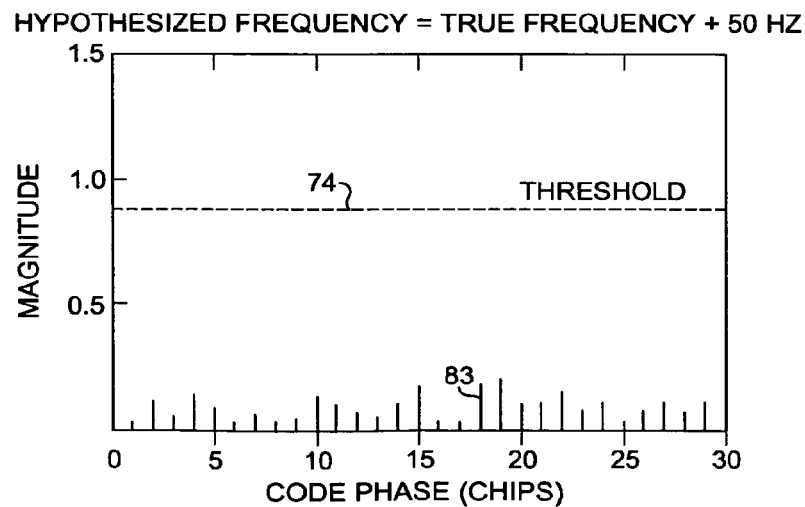

FIGS. 8A, 8B, and 8C show an example of the results of performing the matched filter operations respectively for each of three hypothesized frequencies ($f_h$−50 Hz, $f_h$, $f_h$+50 Hz) for the case when $T_c$=20 msecs (and hence spectral lines of the forward FFT are separated by 50 Hz). In FIG. 8B, the hypothesized frequency is the true frequency, and one can see that a strong detected peak 82 results at one particular code phase offset (index 18). In FIGS. 8A and 8C respectively, the hypothesized frequencies are below and above the true frequency by 50 Hz; therefore in these cases one can see that the strong peak at index location 18 is no longer present (as shown at 81 and 83), nor are any other peaks above the detection threshold. It may be noted that, for simplicity of illustration, the plots in FIGS. 8A, 8B, and 8C only show code phase indices up to 30, whereas if a 1024-point FFT were used, the index would actually range from 0 to 1023.

Incoherent Processing

The method of FIG. 3 corresponds to processing one block of data in a coherent manner, which is a type of correlation termed herein "coherent correlation". In actual practice, however, coherent correlation may not result in sufficient sensitivity to detect a weak GPS signal and measure its code phase. In order to improve sensitivity, the correlation outputs from a number of coherent correlation processes (i.e., correlation series) may be detected and combined, a procedure which is termed "incoherent correlation" or "incoherent processing." Particularly, the coherent integration processes in the above steps 33-39 may be repeated for one or more additional, adjacent time intervals (typically in the range 5 to 200 blocks), and then the results are detected (e.g., their magnitude or magnitude squared is calculated) and combined.

Figure 11:
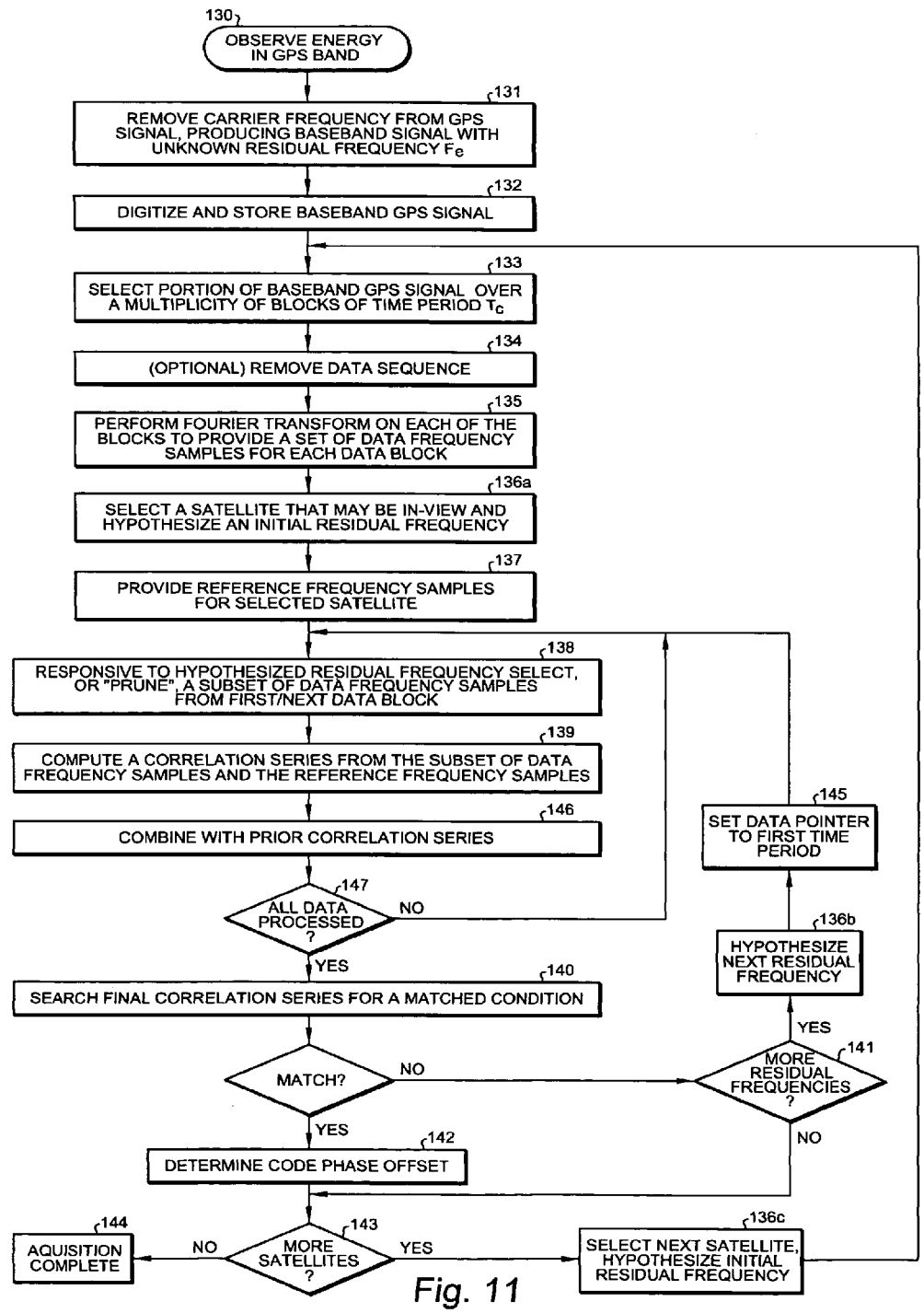
FIG. 11 is a flow chart that illustrates processing that includes combining the results of multiple coherent integration processes.

This modification may be understood more precisely with the aid of FIG. 11. FIG. 11 is a modification of FIG. 3 in which the combination of multiple correlation series is performed prior to searching for a matched condition. The numbering of the blocks of FIG. 11 is similar to that of FIG. 3, except for the addition of a leading "1." For example, the top block in the two figures "observe energy in GPS band" are denoted 30 and 130. FIG. 11 contains additional processing associated with the post-detection accumulation of multiple correlation series. That is, the chief addition is the feedback loop from the output of block 147 to the input of 138 that iterates over a multiplicity of blocks of data. The combining of the multiple correlation series is performed in 146.

Examining FIG. 11 we see that in 133 we have selected data corresponding to a multiplicity of blocks of length $T_c$, as compared to a single block in 33. Then in step 134 we perform FFTs on each of the individual data blocks. This data is then typically saved in a buffer for subsequent use. Steps 136*a* and 137 are the same as 36*a* and 37. Steps 138 and 139 then employ a pruning algorithm as part of a computation of a correlation series from reference frequency samples (corresponding to a given SV and residual frequency) and frequency samples of a given data block. This is similar to 38 and 39. In step 146, however, we combine the resulting correlation series with that similarly performed upon previous blocks of data. Typically this combination will be done by performing a magnitude, or magnitude-squared type detection operation, upon the correlation series and then adding the result to that similarly performed upon prior blocks. In some cases the combination may be a simple addition or other coherent combination. The latter cases are appropriate if computational resources limit the ability to perform coherent processing upon very large data sets.

In 147, one branches to the right in order to repeat the processing of 138, 139, and 146 upon the next block of data, unless all blocks of data have been processed, at which point the processing flow proceeds to 140. When processing proceeds to 140 one has combined all the correlation series that are desired for determining a matched condition. The combined correlation series at this point is termed the "final correlation series." The final correlation series is examined for a matched condition, typically a peak above a detection threshold, and the corresponding code phase offset is found, in a manner similar to that explained for FIG. 3.

In the above description it is noted that the repetition of operations 138, 139, and 146 are upon successive blocks of data, but the hypothesized SV, reference frequency samples, and residual frequency are the same for each repetition. If no match is found in 140, then a new residual frequency is chosen in 136b (unless the set has been completely searched) and the processing 138, 139, 146 begins anew starting with the first data block (145 re-initializes the block number). Since one has previously computed FFTs on all data blocks in step 135, it is not necessary to do any more forward FFTs when altering the hypothesized next residual frequency. That is, the frequency samples for each of the data blocks have been stored in a buffer and may be reused for each of the subsequent residual frequency hypotheses.

After a match has been found or after all residual frequencies have been exhausted the processing proceeds to 143 where, if more SVs need to be examined, one selects the next SV and initial frequency in 136c and then proceeds to step 133. In some cases, such as when no data sequence is present, one could alternatively proceed at this point to step 136a and reuse the data frequency samples from 135 that had already been computed by prior FFT operations.

Example and Mathematical Explanation of Operation

The following description is one explanation of operation of one method disclosed herein, for purpose of illustration and developing a greater understanding of the method.

First, consider the way in which an inverse FFT operation is performed. The originally sampled time data can be represented as x(n): n=0, 1, 2, ..., which is shorthand for the data samples x(0), x($T_s$), x($2T_s$), ..., where $T_s$ is the sample time period. The discrete Fourier transform ("DFT") of this sampled data is denoted by y(0, 1, 2, ...). The DFT of this data effectively denotes frequency samples at frequencies 0, $1/(NT_s)$, $2/(NT_s)$, ..., $m/(NT_s)$, ..., where m is the sample number. The DFT y(m) is defined for each m by:

$$y(m) = \sum_{n=0}^{N-1} x(n) e^{-j2\pi mn/N}, m = 0, 1, \ldots, N-1 \quad (B1)$$

Note that the frequencies of the DFT corresponding to m>N/2, are actually negative frequencies, since by circular symmetry a frequency corresponding to index m (i.e., frequency $m/(NT_s)$) is equivalent to one corresponding to index m−N (i.e., frequency $(m-N)/(NT_s)$). Now, for purposes of this explanation, assume: (1) that the GPS frame period corresponds to R input samples; (2) as before, any satellite data has been removed; (3) the block size N corresponds to K frames, that is, N=KR; and (4) any Doppler effects on the signal modulation are negligible. These assumptions allow the FFT algorithm to perform a periodic convolution.

We are only interested in finding R samples out of a matched filter operation, since the matched filter operation is essentially the circular convolution of the signal data with the periodically repeated reference, as indicated previously. Hence, the matched filter result will also be periodic with period R. Under these circumstances we can provide the matched filter output by operating upon y(m) of equation (B1) in the well-known manner:

$$z(r) = \sum_{m=0}^{N-1} y(m) g*(m) e^{j2\pi mr/N} \quad (B2)$$

where g is the FFT of the GPS reference PN waveform [sampled at the same rate as x(n)], repeated K times, the asterisk represents the complex conjugate, and r is the output time variable, which need only range over [0, 1, ..., R−1]. In equation (B2) we are hypothesizing that the residual carrier frequency of the signal y(m) is zero. As indicated before, because the PN sequence is periodic every frame (i.e., every R samples, the function g(m) has nonzero values every N/R= (KR/R)=K samples (in frequency)). For example, if N corresponds to 20 frames of GPS data, then only every $20^{th}$ sample of the FFT (beginning with the first) of g is nonzero. Accordingly, the product within the summation of equation (B2) is nonzero only for every $20^{th}$ sample, and hence we can write (B2) as:

$$z(r) = \sum_{m=0}^{N/K-1} y(mK) g*(mK) e^{j2\pi mrK/N} \quad (B3)$$

$$= \sum_{m=0}^{N/K-1} y(mK) g*(mK) e^{j2\pi mr/(N/K)}$$

$$= \sum_{m=0}^{R-1} y(mK) g*(mK) e^{j2\pi mr/R}$$

for r=0, 1, ..., R−1.

The last summation is the R-point inverse DFT. Hence, it has been shown that the inverse DFT required for the matched filtering operation may be performed using only an R-sample FFT algorithm, which advantageously reduces processing time and memory requirements. Furthermore only an R-point inverse DFT is necessary, no matter how many PN frames of data, K, are being processed, as long as the above-mentioned conditions are met. Note that equation (B3) is mathematically identical to that which would have been obtained if the full N-point inverse FFT were performed as in equation (B2). Note also that equation (B3) clearly shows the selection of every $K^{th}$ point from the FFT of y for performance of the inverse FFT. This is the basis for the "pruning" procedure, that is, the selection of a subset of points for performing the inverse FFT. Equation (B3) holds whether or not the hypothesized residual carrier frequency error is correct. However, this process will only produce a strong detection indication when the residual carrier frequency error is small compared to $1/T_c$.

The above equation (B3) corresponds to processing the transformed data samples, assuming a residual carrier Doppler shift of zero. It will produce a strong correlation peak only when the residual frequency is close to zero. In order to change this assumption, the Doppler shift is assumed to be $d/(NT_s)$, where d is an integer, and equation (B3) is modified as follows:

$$z(r) = \sum_{m=0}^{R-1} y([mK - d]_{modN}) g*(mK) e^{j2\pi mr/R} \quad (B4)$$

where $[\ ]_{mod\ N}$ is the bracketed quantity, modulo N. Essentially, we are frequency shifting the input signal so that it has near-zero (i.e., much less than 1/Tc) residual frequency, assuming our Doppler hypothesis is correct. Equation (B4) takes advantage of the circular nature of y. Note that this modification is simply a frequency translation of y by d spectral lines, and is straightforwardly implemented by indexing the sequence y (in a circular manner), beginning d positions relative to the first element of y. This approach eliminates the prior art restrictions, discussed in the background section, which would otherwise effectively limit searches over a range greater than about −500 to 500 Hz. The only restriction on the Doppler hypothesis d is an implicit one relating to a stretching of y due to time-Doppler effects (i.e., Doppler on the signal's modulation). This restriction may be removed as discussed below.

One convenient aspect of equation (B4) is that, to process a different GPS code, it may not be necessary to perform another forward transform. In some circumstances, the appropriate GPS code for 'g' (e.g., the appropriate Gold Code) can be substituted into the above, and the prior transformed data can continue to be used. This can be done if the satellite data information (message) present in more than one concurrently received GPS signal is substantially the same. This condition would allow the concurrent removal of the data transmissions on the simultaneously received signals. This is possible if two conditions are met: (A) the differential ranges from the satellites are fairly small (e.g., within 300 km); and (B) the message data information is similar between SV transmissions. Item (B) often occurs, for example, when satellite Almanac is transmitted. Also, item B is not so significant if coherent integration times are less than 20 msecs. It may be noted that, in GPS modes that do not contain data such as those proposed for future implementation, condition (B) would not apply and this modification may be more generally done.

Modulation Doppler Effects.

In the above explanation, the effects of Doppler shifts (including the receiver reference local oscillator-induced "Doppler") have been assumed to mainly affect the carrier frequency. However, if the coherent integration time $NT_s$ becomes sufficiently large, then it may not be possible to ignore the effects of Doppler upon the signal's modulation (i.e., upon the PN sequence P(t)). For present purposes this modulation Doppler effect, or "time Doppler" effect, primarily alters the modulation rate, in effect "stretching" or "compressing" the signal waveform relative to the reference produced in the GPS receiver.

For example, for processing the C/A code for Standard Position Service (civilian service) on GPS, the ratio of the carrier frequency to the chip modulation rate is about 1575.42e6/1.023e6=1540. Hence, a Doppler shift of about 5000 Hz upon the carrier would result in a Doppler shift of about 5000/1540=3.25 Hz on the modulation. For processing relatively short blocks of data coherently (e.g., 20 msecs), such a time Doppler may not be significant. But when processing long blocks of data, the effect can greatly degrade the system sensitivity by significantly reducing the magnitude of the matched filter peak output. As a rule of thumb, if the modulation Doppler (including local oscillator effects) is p Hz, and the total block size N corresponds to $T_c$ seconds, then without additional processing, it is advantageous to keep the quantity $pT_c$ below about ½ in order to reduce deleterious effects.

Consider the above case in which a 10,000 Hz Doppler shift on the carrier results in a 7.143 Hz Doppler shift on the PN modulation. If the coherent block size is about 100 msecs, then $pT_c$=0.7143, and some degradation in system performance would be noticeable. Furthermore, the time of the peak output from the matched filter would be displaced by $pT_c/2$ chips, relative to the zero-Doppler case. It is thus clear that a large Doppler search range and a long coherent integration time will result in significant losses from time Doppler effects, if left uncorrected. This problem is particularly amplified in two important situations:

(1) Large differences between the Doppler shifts from one GPS satellite signal to another, as observed by the GPS receiver. This item has already been discussed above.

(2) An effective Doppler shift due to errors of the GPS local oscillator's frequency relative to its ideal frequency.

Regarding item (2), the GPS local oscillator may differ significantly from the ideal GPS frequency. For example, sometimes a GPS receiver can derive its local oscillator frequency from that of a synchronized cell phone, and hence achieve very low errors. However, in some situations this may not be possible. Even good temperature-compensated crystal oscillators may have frequency errors at the GPS frequency (1575.42 MHz) of over ±3000 Hz. Although such frequency errors are not true Doppler shifts, they create both carrier and modulation shifts at the GPS receiver, similar to the Doppler shifts observed from a moving platform. Such frequency errors are common to all GPS receivers, and therefore affect all GPS signals that are processed to some extent. Nevertheless, these frequency errors can result in deteriorated performance, particularly for long coherent block sizes.

One way of coping with the above problem is to re-sample the input data sequence at a rate commensurate with the Doppler hypothesis of the GPS SV (satellite vehicle) and/or that due to the local oscillator errors. By re-sampling the signal, utilizing digital signal processing methods, the input signal can in effect be stretched or compressed so that there are again an integral number of PN frames of GPS data within the coherent processing block. Without such re-sampling the number of such frames in a coherent block will no longer be an integer but be either more or less by an amount that can be as large as several samples, which could result in severe deterioration of the peak signal produced by the matched filter operation.

However, re-sampling in the time domain, as discussed above, has one significant disadvantage, in that one must re-sample and perform a large forward FFT for a range of frequencies, and for a given SV. The range is such that $|pT_c|$ is less than around ½, as indicated earlier. Unfortunately, this requirement to perform multiple forward FFTs can result in both a substantial increase of system memory requirements, and a substantial increase in processing time.

However, the above disadvantages are eliminated, and particularly the requirement to perform additional forward FFTs can be eliminated, by performing the re-sampling function in the frequency domain. In other words, the re-sampling function can be performed upon the transformed signal y, rather than in the time domain. This approach would completely avoid the requirement to perform additional forward FFTs; however, depending upon implementation, some additional storage may be needed.

To understand the basic principle behind the frequency domain re-sampling, one need only look at the Fourier transform relationship:

$$x(at) \longleftrightarrow \frac{1}{|a|} y(f/a) \quad (B5)$$

where x is the time waveform, y is the Fourier transform of x, and a is a scale shift or stretch. Clearly then, we can perform the stretching in either domain.

The stretching or compression includes re-sampling the frequency samples, a process that involves fractional re-sampling methods. From (B5) we see that if the frequency samples are called y(m) and thus these samples are initially provided at frequencies m=[0, 1, 2, . . . ]/(NT$_s$), then these samples are replaced by samples evaluated at the frequencies m/a; that is, by samples evaluated at frequencies of m$_r$=[0, 1, 2, . . . ]/(aNT$_s$)=[0, 1/a, 2/a, . . . ].

It may be noticed that this last result is only correct for positive frequencies since we must ensure that the data samples are spaced symmetrically about 0 Hz. To do this, if we reorder the initial set in the order: −N/2−1, −N/2, . . . , −1, 0, 1, . . . , N/2−1, N/2, then the re-sampled set is re-sampled at frequencies:

$$[(-N/2-1)/a, (-N/2)/a, \ldots, -2/a, -1/a, 0, 1/a, 2/a, \ldots , (N/2)/a]/(NT_s) \quad (B6)$$

that is, if we use the original order, it is re-sampled at frequencies:

$$m/a: \text{ for } m=0,1,2,\ldots,N/2 \quad (B7)$$

$$N+(m-N)/a: \text{ for } m=N/2+1, N/2+2, \ldots, N-1 \quad (B8)$$

where we note the circular nature of frequency so that frequency index m is the same as m+N or m−N.

The re-sampling of equation (B6) or (B7) requires evaluating the frequency response at frequencies that are "between" the normal discrete frequencies evaluated by the DFT. But this is relatively easy to do with a "sinc" interpolator, for example. Since the input data is time limited, we can evaluate the (complex) frequency response at frequency ϵ, where |ϵ|<0.5, relative to a set of spectral lines, through a convolution procedure. For example, to evaluate the spectral response at frequency y(m$_0$+ϵ), where m$_0$ is an integer, we form the product:

$$\sum_m y(m_{modN}) \text{sinc}(m_0 + \varepsilon - m) \quad (B9)$$

where m ranges over all possible values (i.e., from m−N/2+1 to m+N/2).

A simple approximation to this calculation would require only two or three values of m. An estimate of the loss due to the two-term evaluation of equation (B9) indicates that such a sensitivity loss is less than 1 dB, if ϵ ranges over the range from −0.5 to 0.5. For most modulation Doppler shifts of interest, the stretching due to equation (B5) may be considered to be fairly constant for a relatively large number of consecutive frequency samples. Hence, the interpolation procedure of equation (B9) can use the same values for the sinc weighting coefficients in order to determine a large number of consecutive re-sampled spectral values.

The re-sampling method described above thus allows use of an algorithm in which the frequency data y is broken into a series of smaller blocks, for example of size 1024 each, and each block is re-sampled using an interpolation procedure with a fixed set of coefficients. Prior to processing a block, the coefficients are either computed or are looked up in a table. This procedure could greatly reduce the processing burden for the re-sampling operation. For example, if a two-point interpolation procedure like equation (B9) were employed, the re-sampling procedure would require only four real multiplies and two additions to compute each interpolated value (ignoring the above-mentioned table lookup). This method can be compared with, for example eight butterflies per data sample necessary to compute an FFT on a block size equal to 64K. These butterflies would require 32 real multiplies and 48 additions, a computational increase by a factor of about 16 relative to the interpolation in the frequency domain. Hence frequency domain re-sampling is believed to be much more practical and efficient than time-domain re-sampling.

As disclosed herein, re-sampling is useful to compensate for modulation Doppler when either processing very large ranges of Doppler shifts, and/or when processing signals from different SVs. In such cases the same Fourier-transformed data set can be utilized and therefore it would be unnecessary to deal with the original time data. As indicated before, however, processing different SVs with the same Fourier-transformed data set may be limited to situations in which the satellite message data is similar, in order to allow its removal prior to the initial coherent processing. In any case it is useful to retain the original Fourier-transformed data set even after a re-sampling operation is performed, in the event that a second and additional re-samplings are required. If the original Fourier-transformed data set is not available, it would be necessary to perform re-sampling on a re-sampled set, an approach that could result in cumulative errors unless very precise re-sampling were to be performed.

The pruning operation has been defined as a selection of a subset of the frequency data from the forward FFT, due to the sparseness of the spectrum associated with the repeated PN signal (i.e., the comb line shape). When spectral interpolation is required, as discussed above, we construct, rather than merely select, the subset by interpolation between frequency samples. Nevertheless, the size of the subset so constructed is similar to the case in which simple selection is made. That is, it is typically equal to the number of signal samples per one PN frame. In the prior examples, it was either 1024 or 2048 samples, corresponding to sample rates 1.024 MHz or 2.048 MHz. The inverse FFT sizes are accordingly these sizes as well. Consequently the definition of "pruning" extends to the construction of a subset of frequency samples via an interpolation procedure, as well as the direct selection of a subset of frequency samples.

In a similar manner the interpolation procedure may be utilized when one wishes to alter successive frequency hypotheses by increments that are smaller than an FFT line spacing (for example, an increment of one-half a line spacing). Again, the pruning definition extends to the construction of a subset of frequency samples via an interpolation procedure in which the frequency hypothesis is altered by a fraction of the FFT line spacing.

It will be appreciated by those skilled in the art, in view of these teachings, that alternative embodiments may be easily implemented.

For example in the prior discussion, as exemplified for example by FIG. 2 or FIG. 3, there is an initial frequency translation operation in order to frequency translate the signal to near zero frequency. This may be done with conventional local oscillators and mixers, in a manner well known in the art. It may also be done by filtering the incoming RF energy in the vicinity of the GPS frequency band, and then directly sampling this filtered energy at a rate commensurate with the filter bandwidth. It is well known that this approach can result in an effective frequency translation. Hence the terminology "frequency translation" applies to these direct RF sampling methods as well as to conventional frequency translation methods. In addition, although FIG. 3 implies that the carrier frequency is removed prior to digitization, leaving a residual frequency, $f_e$, it is often the case that only the bulk of the carrier frequency is removed and that the signal is the frequency translated to a low IF frequency, say $f_{IF}+f_e$, prior to digitizing. Following the digitizing operation, the IF frequency $f_{IF}$ is typically substantially removed by means of digital signal processing methods. The result of the processing then follows as shown at Step 33 of FIG. 3. Such variations on the initial signal preprocessing should be apparent to those skilled in the art.

What is claimed is:

1. A non-transitory machine-readable medium comprising instructions, which when executed by a machine, perform steps in a method for acquiring transmissions from a transmitter, wherein the transmissions include a periodically-repeating pseudonoise (PN) sequence, and wherein, the steps, upon execution, cause the machine to:
   receive a data block of samples, from the transmitter, comprising an integer number of repetitions of a received PN sequence;
   compute frequency data values from the data block of samples;
   provide a set of reference frequency values thereby hypothesizing a reference PN sequence of the transmitter;
   hypothesize a residual frequency;
   prune the frequency data values, based on the residual frequency and based on the integer number of repetitions, to provide a subset of the frequency data values;
   compute a correlation series using the subset of the frequency data values and the set of reference frequency values; and
   determine whether a matched condition occurs between the received PN sequence and the reference PN sequence using the correlation series.

2. The non-transitory machine-readable medium of claim 1, further comprising instructions that upon execution cause a machine to:
   derive the data block of samples from a GPS satellite signal.

3. A non-transitory machine-readable medium comprising instructions, which when executed by a machine, perform steps in a method for receiving a signal with a receiver, said signal transmitted at a predetermined carrier frequency from one of a plurality of transmitters, said signal including a waveform modulated according to periodically-repeating pseudonoise (PN) sequence that uniquely identifies the transmitter that sent the signal, said signal used in determining a location of the receiver, and wherein, the steps, upon execution, cause a machine to:
   receive, at the receiver, electromagnetic energy in the vicinity of said carrier frequency, and digitizing said energy for a predefined period of time,
   hypothesize one of said plurality of transmitters and an associated hypothesized signal and provide a set of reference frequency samples corresponding to said hypothesized signal;
   hypothesize a first residual frequency;
   select from said digitized energy a first subset of data of length at least equal to two repetitions of said periodically-repeating PN sequences, thereby defining a first data block;
   responsive to said first data block, calculate a first set of data frequency samples;
   prune said first set of data frequency samples responsive to said hypothesized first residual frequency to provide a periodically-spaced first subset of said data frequency samples, wherein said periodically-spaced first subset includes a plurality of samples having indices spaced relative to one another by an integer K, wherein K is the number of PN sequences in said first data block;
   compute a first correlation series from said periodically-spaced first subset of said first set of data frequency samples and said set of reference frequency samples;
   compute a first final correlation series comprising at least said first correlation series; and
   examine said first final correlation series to determine whether a matched condition occurs between said transmitted signal and said hypothesized signal.

4. The non-transitory machine-readable medium of claim 3, wherein said periodically-spaced first subset comprises a plurality of data frequency samples spaced relative to one another in Hertz by a repetition rate of said periodically-repeating sequence.

5. The non-transitory machine-readable medium of claim 3, wherein said instructions to prune includes interpolating between said first set of data frequency samples.

6. The non-transitory machine-readable medium of claim 3, wherein said instructions to compute the first correlation includes multiplying first subset of said first set of data frequency samples with said set of reference frequency samples, to form a set of weighted frequency samples.

7. The non-transitory machine-readable medium of claim 3, wherein said transmitters comprise a plurality of GPS satellites that transmit GPS signals at a GPS frequency, each GPS satellite transmitting a unique periodically-repeating sequence.

8. The non-transitory machine-readable medium of claim 3, wherein said data block has a size that corresponds to an integral number of repetitions of said periodically-repeating sequences.

* * * * *